US007657562B2

(12) United States Patent  (10) Patent No.: US 7,657,562 B2
Inoue et al.  (45) Date of Patent: Feb. 2, 2010

(54) DATA PROCESSING APPARATUS AND DATA PROCESSING METHOD

(75) Inventors: Shinji Inoue, Osaka (JP); Makoto Ochi, Osaka (JP); Hirokazu So, Osaka (JP); Takuji Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 10/596,780

(22) PCT Filed: Dec. 22, 2004

(86) PCT No.: PCT/JP2004/019232

§ 371 (c)(1),
(2), (4) Date: Jun. 23, 2006

(87) PCT Pub. No.: WO2005/062184

PCT Pub. Date: Jul. 7, 2005

(65) Prior Publication Data

US 2007/0174334 A1  Jul. 26, 2007

(30) Foreign Application Priority Data

Dec. 24, 2003  (JP)  ............................. 2003-426809

(51) Int. Cl.
*G06F 17/00* (2006.01)
(52) U.S. Cl. .................... 707/104.1; 713/189
(58) Field of Classification Search ........................ None
See application file for complete search history.

(56) References Cited

U.S. PATENT DOCUMENTS

| 5,713,022 A | 1/1998 | Yamashita | ............... 707/104.1 |
| 2002/0067352 A1* | 6/2002 | Takeuchi | .................... 345/204 |
| 2002/0069205 A1* | 6/2002 | Morita et al. | .................. 707/10 |
| 2002/0122076 A1* | 9/2002 | Nakaki | ....................... 345/847 |
| 2002/0165825 A1* | 11/2002 | Matsushima et al. | .......... 705/51 |
| 2003/0133368 A1* | 7/2003 | Gotoh et al. | ............. 369/13.56 |
| 2005/0216684 A1 | 9/2005 | So et al. | |
| 2005/0231765 A1 | 10/2005 | So et al. | |
| 2006/0050622 A1 | 3/2006 | So et al. | |
| 2006/0195672 A1 | 8/2006 | Inoue et al. | |

FOREIGN PATENT DOCUMENTS

| JP | 63-000744 | 1/1988 |
| JP | 5-274375 | 10/1993 |
| JP | 2001-034515 | 2/2001 |
| JP | 2001-249693 | 9/2001 |
| JP | 2002-116935 | 4/2002 |
| JP | 2003-233517 | 8/2003 |
| WO | 00/74054 | 2/2000 |

OTHER PUBLICATIONS

English language Abstract of JP 5-274375.

(Continued)

*Primary Examiner*—Pierre M Vital
*Assistant Examiner*—Truong V Vo
(74) *Attorney, Agent, or Firm*—Greenblum & Bernstein P.L.C.

(57) ABSTRACT

A data processing apparatus is capable of playing back contents stored in a specified area in a recording medium. The recording medium stores content data and management information for managing the content data. When playing back a content which is managed by the management information on the recording medium but of which entity data is not present in the specified area of the recording medium, the data processing apparatus, searches, for the content, the other area of the recording medium with a search section. When the corresponding content is found, the link information setting section sets the link information (symbolic link, shortcut, etc.) on the recording medium so that the content can be accessed with the management information.

19 Claims, 20 Drawing Sheets

OTHER PUBLICATIONS

English language Abstract of JP 63-000744.
English language Abstract of JP 2001-034515.
English language Abstract of JP 2003-233517.
English language Abstract of JP 2002-116935.
English language Abstract of JP 2001-249693.
U.S. Appl. No. 10/577,418 to Maeda et al, which was filed on Apr. 27, 2006.
U.S. Appl. No. 10/578,373 to So et al., which was filed on May 5, 2006.
U.S. Appl. No. 10/578,372 to Maeda et al., which was filed on May 5, 2006.
U.S. Appl. No. 10/596,155 to So et al., which was filed on Jun. 1, 2006.

* cited by examiner

NORMAL STATE

AFTER ERRONEOUS OPERATION

CONTENT FILE "WAKARE.SA"

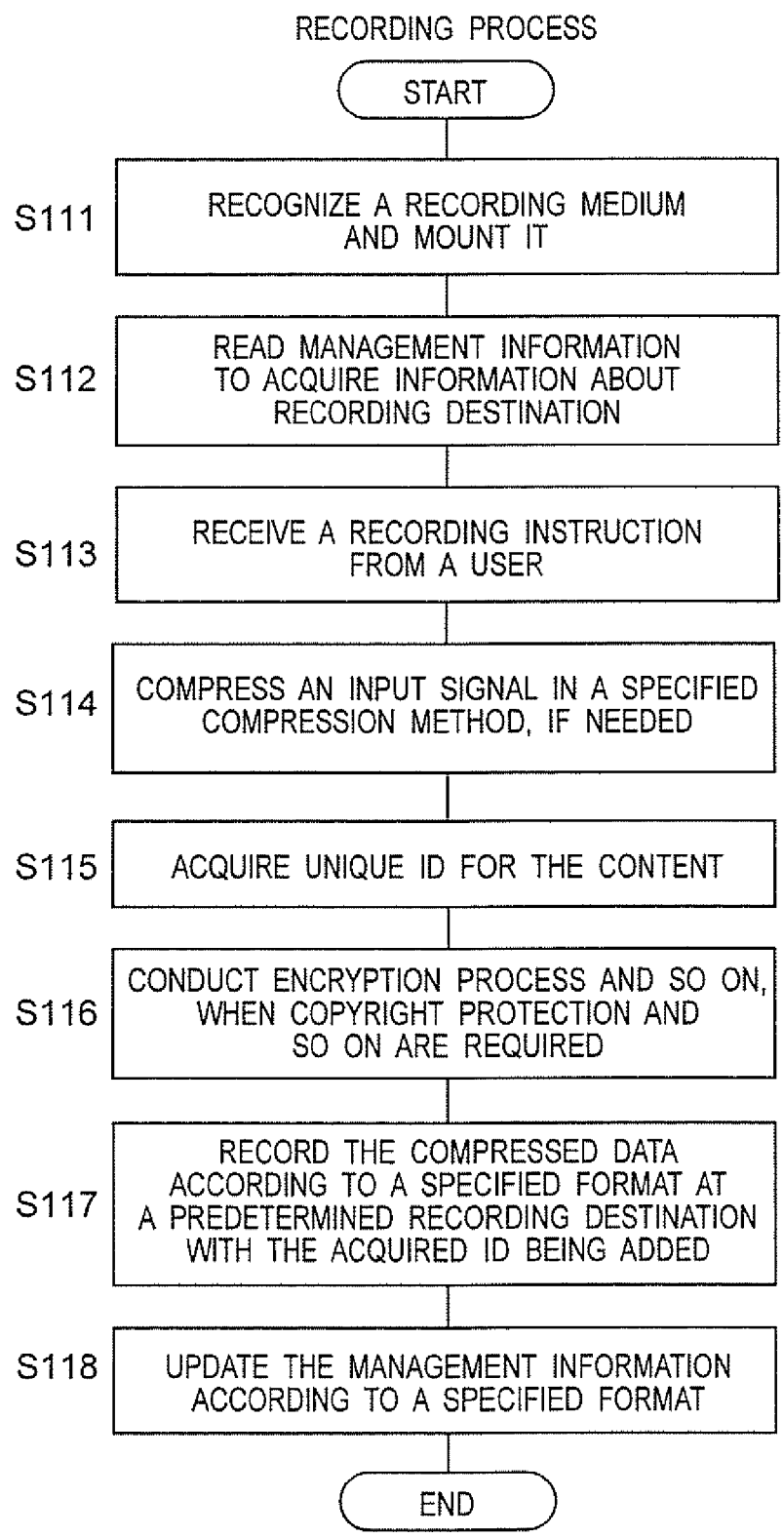

DATA PROCESSING APPARATUS AND DATA PROCESSING METHOD

TECHNICAL FIELD

The invention relates to a data processing apparatus and a data processing method for processing data stored in a specified format in a readable and writable recording medium.

BACKGROUND ART

Recently, as a recording medium to/from which digital data can be written/read, various media are developed including SD Memory Card (registered trademark), is Memory Stick (registered trademark), Compact Flash (registered trademark), and other semiconductor memories (or memory cards). A hard disk with small size and large capacity is also widely used.

The data processing apparatus for processing data using the semiconductor memory and the hard disk is applied in various electric products such as personal computer, audio appliance, video appliance, cellphone and digital camera.

A large capacity hard disk is useful as storage device for storing a large capacity of data in a product. A detachable and portable recording medium such as semiconductor memory is particularly useful as bridge medium for exchanging data between data processing apparatuses.

In the recording medium used as such bridge medium, data recorded by one data processing apparatus may be updated by other data processing apparatus. In this case, due to mishandling by the user, or the like, the data may be moved away to a position at which the data should be positioned essentially. For example, while viewing a content in a recording medium using browser software of a personal computer, the data may be moved to other directory, unknowingly by erroneous operation of a mouse or other input device.

Regarding the recording medium used as such bridge medium, copyright protection is should be taken into account. Concerning an apparatus which can play back copyright-protected music data stored in a portable recording medium, a recording method and playback method thereof are disclosed, for example, in patent document 1.

According to the disclosed method, using a personal computer or the like, a plurality of encrypted music data, meta information relating to the music data, and play list for defining play back sequence of the music data are stored in a portable recording medium. Further, the recording medium is loaded in the personal computer or a portable electronic appliance. The appliance searches a specified position for the data to play back the music data according to the play list stored in the loaded recording medium.

Patent document 1: JP-A-2001-249693

DISCLOSURE OF THE INVENTION

Problems to be Solved by the Invention

Generally, for a portable recording medium, various standards of data recording and playback methods are present. For example, depending on a standard, the storing position of data to be played back in the recording medium is specified. The recording medium in which data are recorded according to the standard can be played back by an electronic appliance conforming to the standard.

When a portable recording medium is often used as bridge medium for data exchange, if the portable recording medium is installed in an electronic appliance which can freely process contents in the recording medium, the data may be moved by the user unintentionally or unknowingly by mishandling by the user. As a result, the data are not present at the position specified by the standard, and when the moved data are designated as playback data, the playback data may be handled as wrong data and may not be played back.

The invention is directed to solve such problems, and it is hence an object thereof to provide a data processing apparatus and a data processing method that can play back data which is not present at a specified storage position.

Solving Means

A data processing apparatus according to the invention is a data processing apparatus which reads from a recording medium a content which is stored in a specified recording area of the recording medium and plays back the read content. The recording medium stores contents and management information of the contents according to a specified format. In the data processing apparatus, a content processor reads management information from the recording medium, and reads the content according to the management information from the recording medium to process the read content. When the content processor reads a content, a search section searches a specified search range for the content, if the content to be read is managed by the management information but not present in the specified recording area. When the content is found by the search section, the link information setting section sets the link information for relating the recording area of the found content to the specified recording area so as to enable access to the content with the management information.

A data processing method according to the invention is a method for reading from a recording medium a content which is stored in a specified recording area of the recording medium and playing back the read content. The recording medium stores contents and management information of the contents, according to a specified format. In the data processing method, management information is read from the recording medium, and the content to be played back is determined with reference to the read management information. It is judged if the determined content exists in a specified recording area in the recording medium.

A specified search range is searched for the content if the determined content does not exist in the specified recording area. When the determined content is found, link information for relating the recording area of the found content to the specified recording area is set so that the content can be accessed with the management information.

EFFECTS OF THE INVENTION

According to the invention, even if data recorded on a programmable recording medium according to a specified standard is moved by erroneous operation by the user and thus the data storage state becomes out of the standard, the contents can be played back. That is, the data moved by erroneous operation by the user can be managed as if not moved away from a specified position. Thus the user can enjoy the electronic contents assuredly. Further, if used together with inexpensive hard disk which has large capacity but is not excellent in portability, the portable recording medium can be handled as if it has data area more than capacity of itself.

BRIEF DESCRIPTION OF THE DRAWINGS

FIG. 20 is a flowchart of content recording process of the data processing apparatus in embodiment 3.

REFERENCE SIGNS

Figure 1:
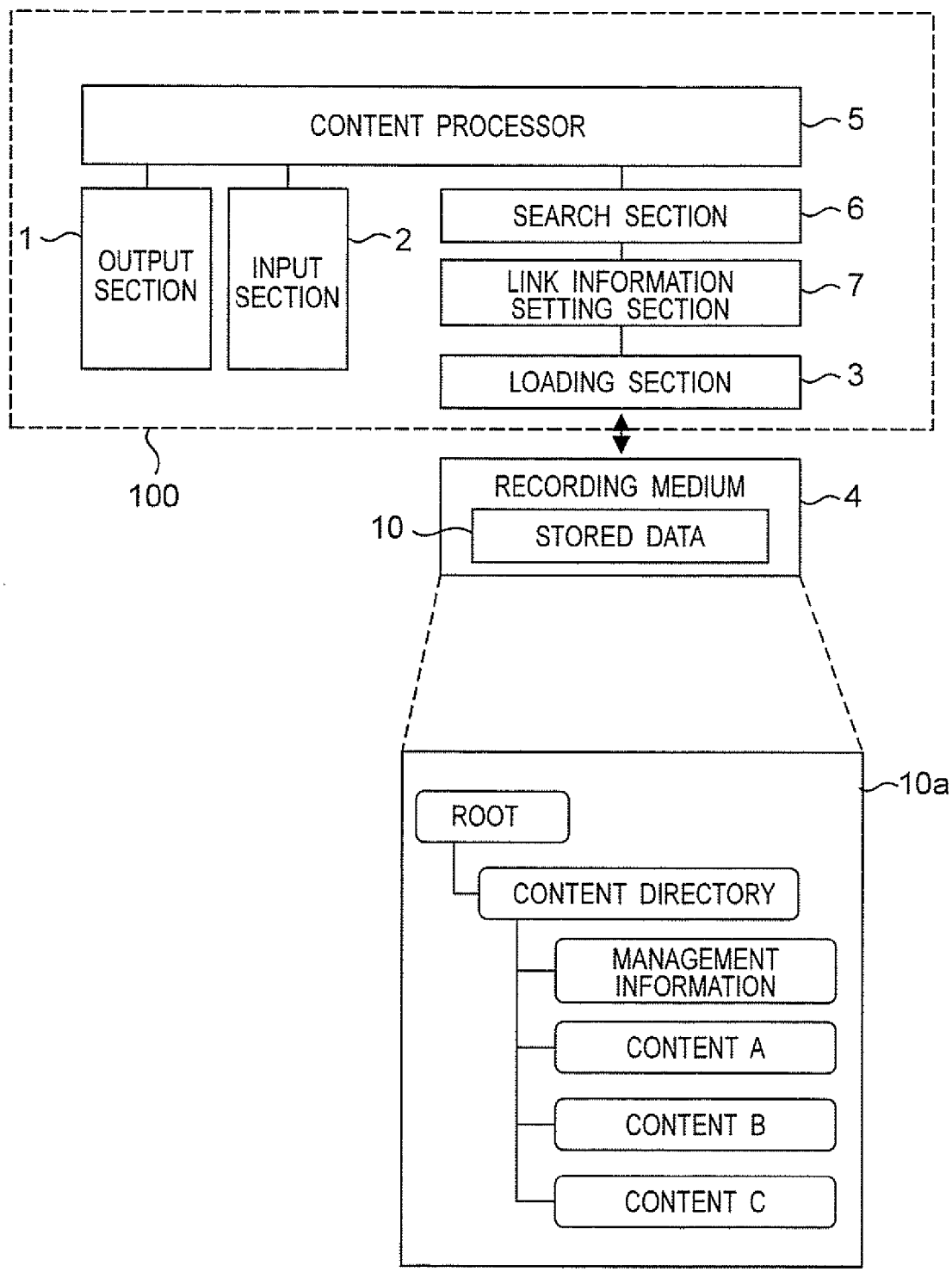
FIG. 1 is a block diagram of a functional configuration of a data processing apparatus in embodiment 1 of the invention.

1 Output section
2 Input section
3 Loading section
4 Recording medium
5 Content processor
6 Search section
7 Link information setting section
8 Management information storage section
100, 100b Data processing apparatus

BEST MODE FOR CARRYING OUT THE INVENTION

Embodiments of a data processing apparatus and data processing method of the invention are described below with reference to the drawings.

The data processing apparatus explained below operates based on the following principle. The data processing apparatus conforms to a specified format determined by a specified standard (for example, SD-Audio standard), and thus records, plays back, and manages contents on recording medium according to the specified format. Therefore, content data is recorded to the recording medium according to the specified format, and hence a storage position of the content in the recording medium is specified. When playing back data, the data processing apparatus plays back the content located at the specified storage position according to the specified format.

Embodiment 1

1. Configuration

Embodiment 1 of the invention is specifically described below with reference to the accompanying drawings.

FIG. 1 is a block diagram of a functional configuration of the data processing apparatus in embodiment 1 of the invention. In FIG. 1, a data processing apparatus 100 includes an output section 1, an input section 2, a loading section 3, a content processor 5, a search section 6, and a link information setting section 7.

The output section 1 displays and plays back electronic content, such as image data, video data, audio data, and other. The input section 2 is used by the user or instructing and operating the data processing apparatus 100 directly or on a screen of the output section 1.

The input section 2 receives analog voice, video data, and audio data from outside of the data processing apparatus 100. The loading section 3 serves to load the data processing apparatus 100 with the recording medium 4 which stores data. The data processing apparatus 100 and recording medium 4 constitute a data processing system.

The content processor 5 compresses stored data 10 such as video and audio data received via the input section 2 as required, and further encrypts as required, and stores it in the recording medium 4. The content processor 5 also plays back the data stored in the recording medium 4.

In the recording medium 4, data 10 are stored in a data structure conforming to a format defined by a specified standard on the basis of file system such as FAT, NTFS, and others. According to the directory structure 10a in the recording medium 4, a content directory storing contents is present under a root directory which is the highest directory of the recording medium 4. The content directory stores content data (contents A, B, and C in the diagram) and management information about content data. This directory structure is defined according to the specified format. The management information includes meta information such as information for specifying playback sequence of contents, title of contents, artist's name, and file name.

When content is not present at a position designated by the management information stored in the recording medium 4, the search section 6 searches for the content in the other area of the recording medium 4 or on other recording medium.

When the search section 6 succeeds in content search, the link information setting section 7 sets the link information, using mechanism of symbolic link or the like for linking the file name and entity data, as if the content is present at the position defined by the management information.

Figure 2:
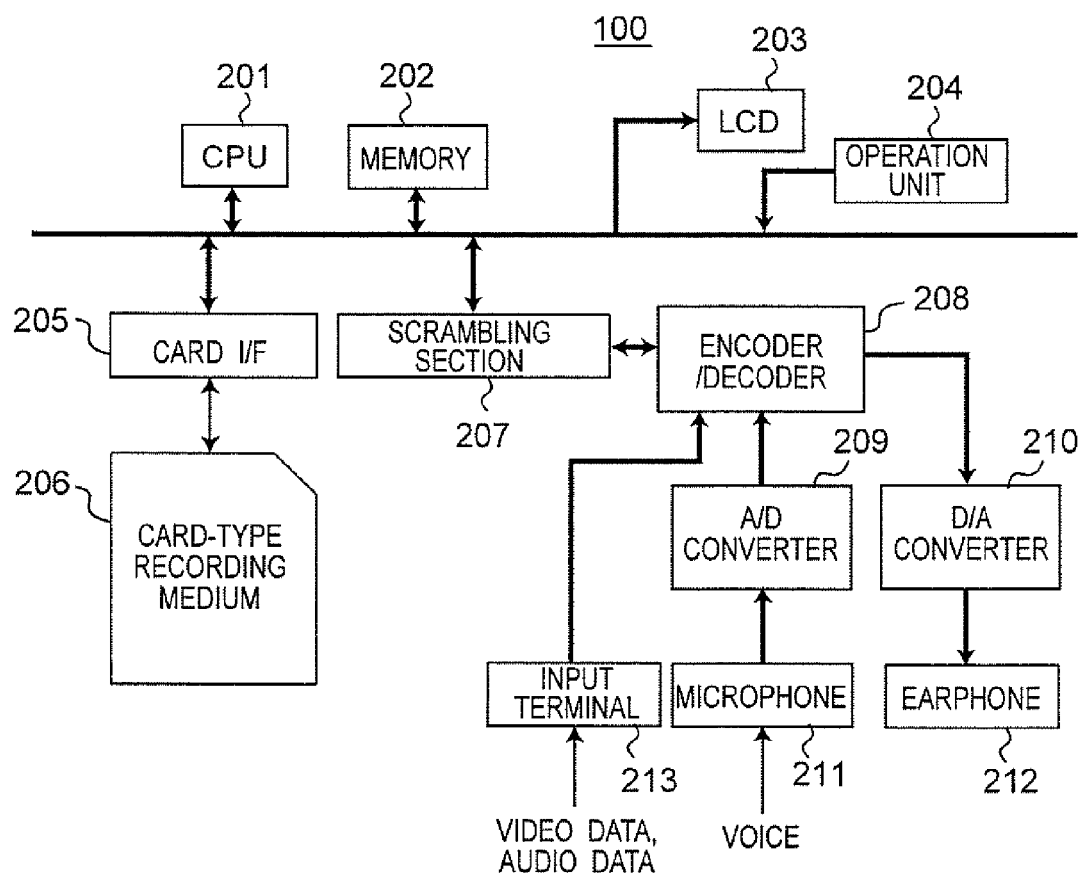
FIG. 2 is a diagram of a hardware configuration of the data processing apparatus in embodiment 1.

FIG. 2 is a diagram of a hardware configuration of the data processing apparatus 100 in embodiment 1 of the invention.

In FIG. 2, a CPU (Central Processing Unit) 201 executes various processes a memory 202 snores programs and data necessary for process executed by the CPU 201. An LCD (Liquid Crystal Display device) 203 displays image information. An operation unit 204 receives operation information from the user. A card I/F (interface) section 205 receives a card medium 206 which is the recording medium 4. The card medium 206 is one of nonvolatile recording media, and is loaded in the card I/F section 205.

A scrambling section 207 encrypts and decrypts contents to be stored in the card medium 206, as required. An encoder/decoder 208 compresses the received digital data, or expands the compressed contents.

A microphone 211 may be an input terminal and inputs analog audio information. An earphone 212 may be an output terminal and outputs audio information. An input terminal 213 receives digital video and audio data, and outputs the received digital data to the encoder 208.

An A/D converter 209 converts the analog data entered from the microphone 211 into digital data. A D/A converter 210 converts the digital data output from the decoder 208 into an analog signal to output it to the earphone 212.

In FIG. 2, the LCD 203, and an output system including the scrambling section 207, decoder 208, D/A converter 210 and earphone 212 correspond to the output section 1 in FIG. 1. The operation unit 204, and an input system including the microphone 211, A/D converter 209, encoder 208 and scrambling section 207 correspond to the input section 2 in FIG. 1. The card I/F unit 205 and card medium 206 correspond to the loading section 3 and recording medium 4 in FIG. 1, respectively. The CPU 201 executes specified programs loaded on the memory 202 to realizes functions of the content processor 5, the search section 6, and the link information setting section 7 in FIG. 1.

Figure 3:
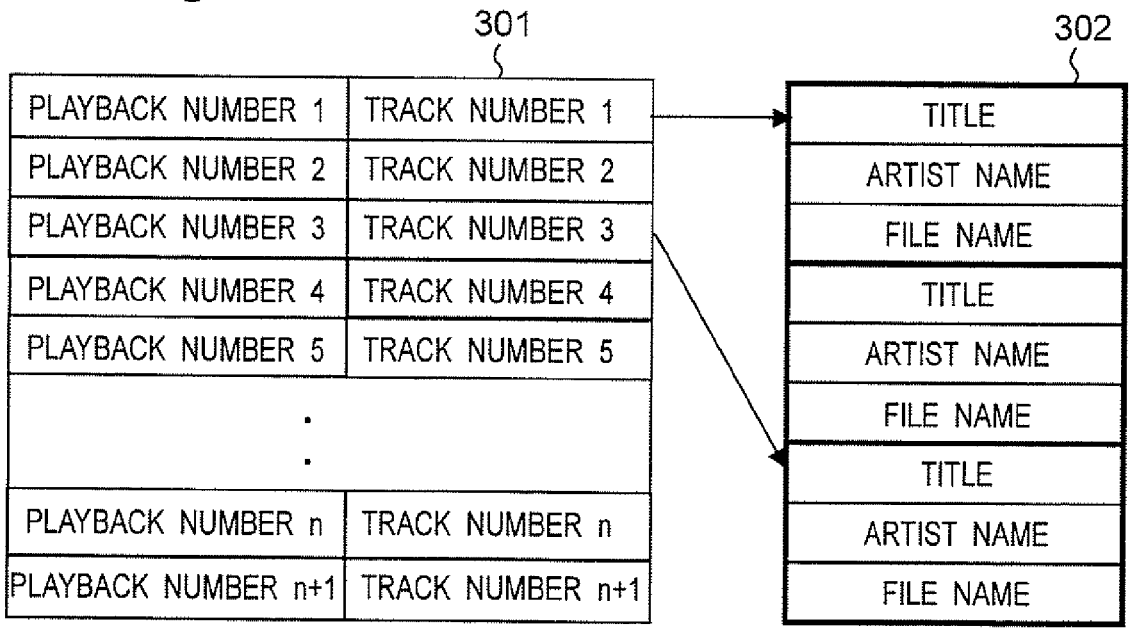
FIG. 3 is a diagram of data structure of management information in embodiment 1.

FIG. 3 is a diagram of data structure of the management information stored in the recording medium 4. As shown in the diagram, the management information includes play list information 301 showing the playback sequence of contents, and track information 302 including meta information concerning contents such as title and artist's name. The play list information 301 plays the role of relating the playback number showing the playback sequence to the track number specifying the position of track information of content which is to be played back in the playback sequence. The track information 302 manages meta information including a set of title showing tune name of the content, artist name showing a performer of the content, and file name of the content, in one set of contents. In the case of plural sets of contents, the track information 302 includes a plurality of meta information. The tract number specifies one meta information in the track information 302.

Figure 4:
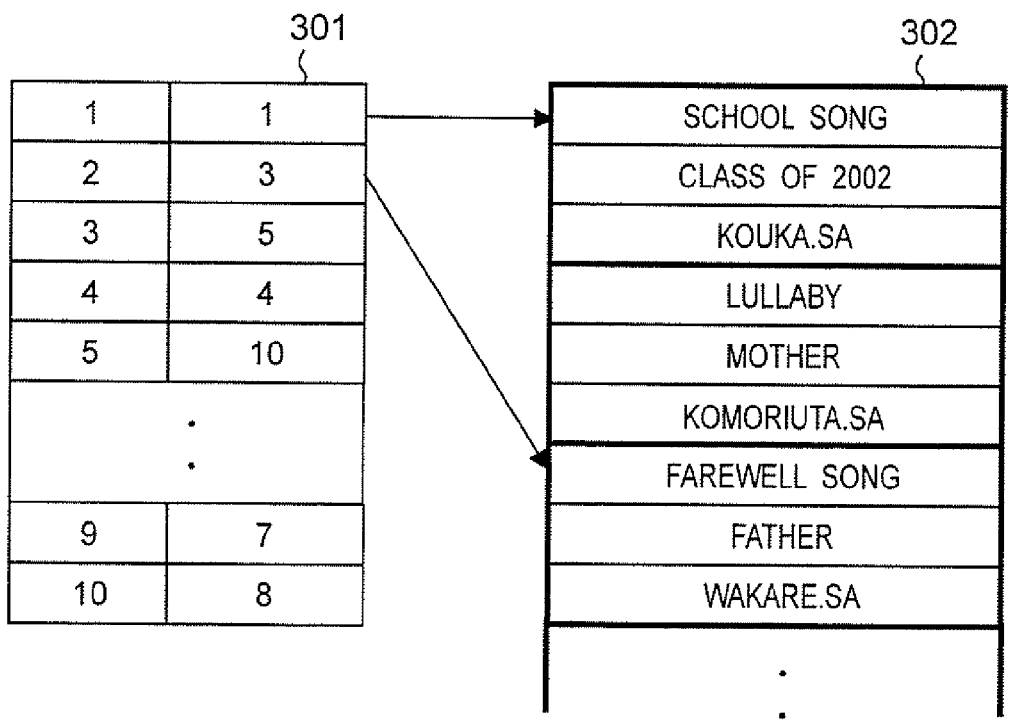
FIG. 4 shows data example of the management information in embodiment 1.

FIG. 4 is an example of data stored in the management information. According to the play list information 301 of the diagram, the meta information relating to the content to be played back first is the first set of information in the track information 302, and the meta information relating to the content to be played is back secondly is the third set of information in the track information 302. That is, according to this management information, first in playback sequence, the content data with title of "SCHOOL SONG", file name of "KOUKA.SA", and performer of "CLASS OF 2002" is played back. Next, the content data of file name of "WAKARE.SA", performer of "FATHER," and title of "FAREWELL SONG" is played back.

2. Operation 2.1 Recording Process

Figure 5:
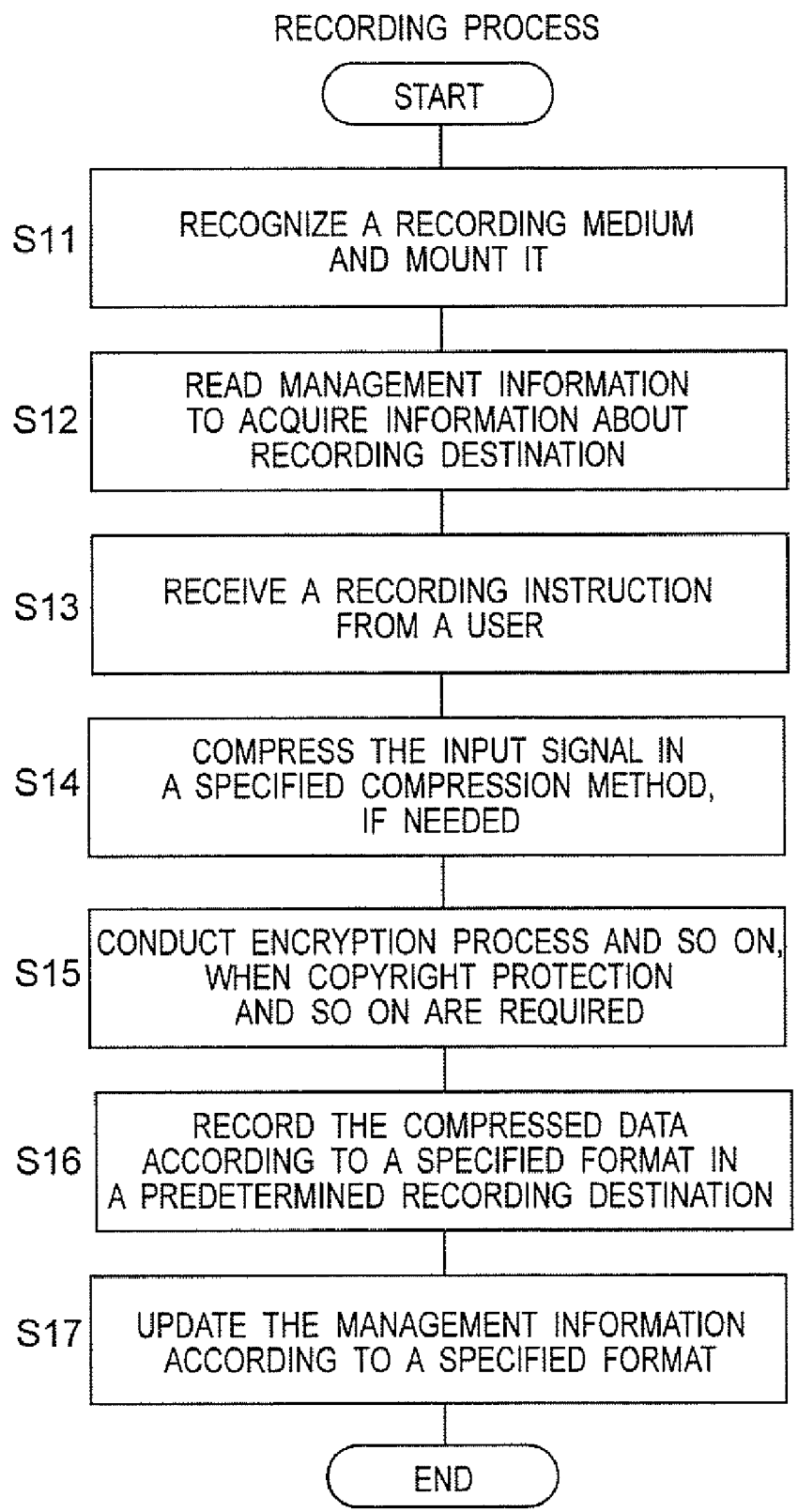
FIG. 5 is a flowchart of content recording process of the data processing apparatus in embodiment 1.

FIG. 5 is a flowchart of process of the data processing apparatus 100 in embodiment 1 of the invention for recording the content in recording medium 4. The process at recording the content is explained below with reference to the diagram.

First, when the recording medium 4 is loaded in the loading section 3, the data processing apparatus 100 recognizes and mounts the recording medium 4 (step S11). Next, the management file storing the management information is read from the recording medium 4, and information about recording destination of the content (specifically the file name) is acquired from the management information (step S12). The directory in which the content should be recorded is defined uniquely according to the specified format, and the data processing apparatus 100 holds information about the directory name of the recording destination. Hence, the data processing apparatus 100 can determine the recording destination from the file name read from the management information and the directory name of the recording destination held in itself. In this embodiment and in the following embodiments, it is supposed that according to the specified format, the "content directory" which is located immediately beneath the root directory is defined as the recording destination.

The user instructs the data processing apparatus 100 to record data via the input section 2. When user instructs to record data, the input section 2 acquires the instruction information (S13) to send it to the content processor 5. At this time, information to be recorded (analog audio, audio data, etc.) is input to the data processing apparatus 100 from outside through the input section 2. When the input information is analog information, it is converted into digital data by A/D converter. At the same time, meta information such as title and artist name is also entered through the input section 2.

The content processor 5 compresses the data entered from the input section 2, as required, in a specified compression method (step S14). Further, when data must be encrypted such as when the copyright must be protected, the data is encrypted (step S15). The encrypted content is stored in the recording destination determined on the basis of the file name acquired at step S12 in the recording medium 4 according to the specified format (step S16). Finally, according to the specified format, the management information is updated (step S17). That is, in the newly added data, the play list information 301 and track information 302 are updated.

2.2 Playback Process

Figure 6:
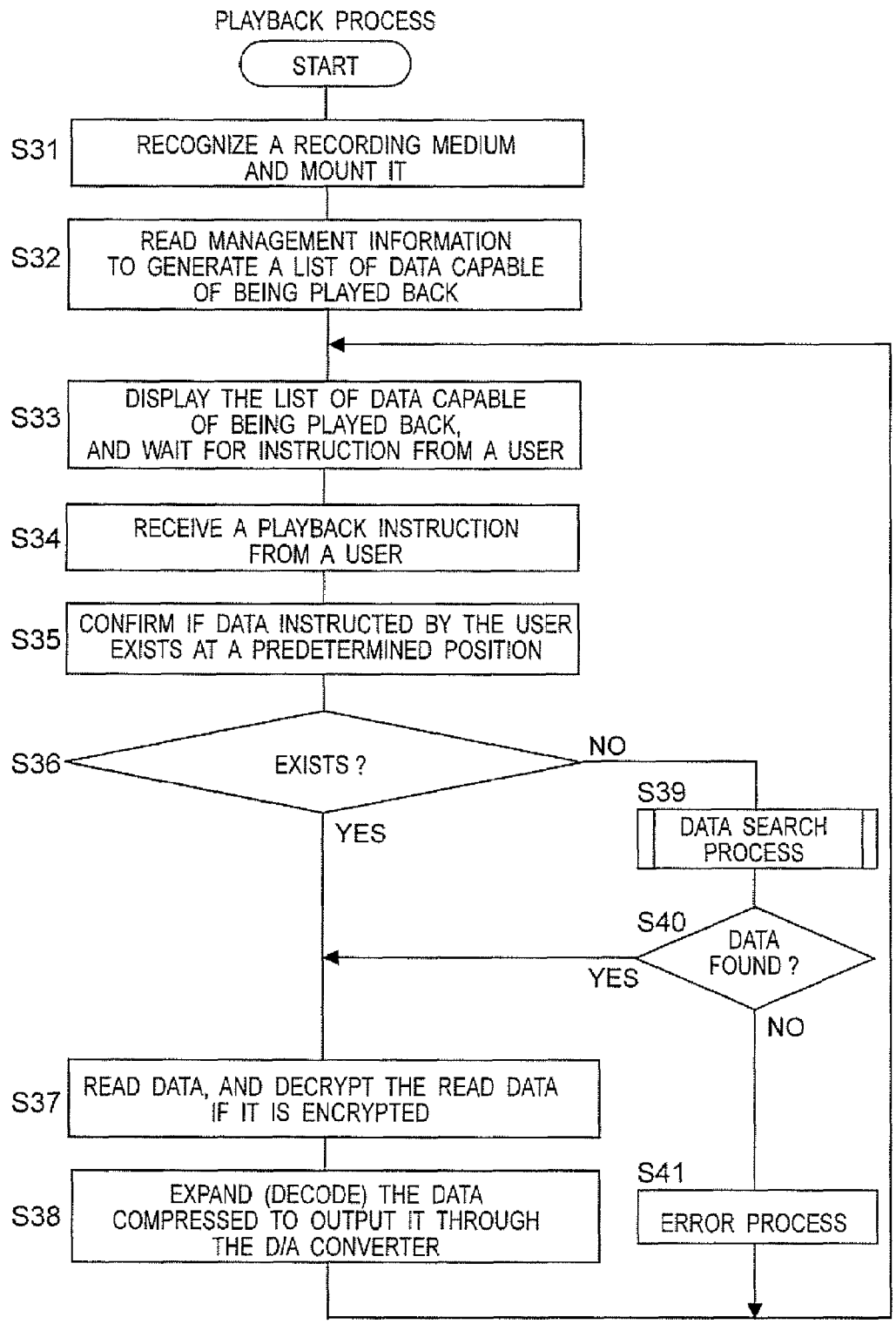
FIG. 6 is a flowchart or content playback process of the data processing apparatus in embodiment 1.

FIG. 6 is a flowchart of process of the data processing apparatus 100 in embodiment 1 of the invention for playing back the content stored in the recording medium 4.

When the recording medium 4 is loaded in the loading section 3, the data processing apparatus 100 recognizes and mounts the recording medium 4 (step S31). Next, the content processor 5 reads the management file which stores the management information from the recording medium 4, and generates, with reference to the play list information 301, a list of contents that can be played back (step 532). The list is displayed in the output section 1, and the process waits for instruction from the user (step S33). When the user give an instruction for playback, the input section 2 acquires the user's operation information, that is, playback instruction (step S34), and sends it to the content processor 5.

When receiving the playback instruction, the content processor 5 achieves a process to play back the contents in the sequence specified in the play list information 301. For this purpose, the content processor 5 refers to the track information 302 specified by the track number in the sequence of the play list information 301, and acquires the file name of the content to be played back. When the user Instructs playback of a specific content, by referring to the management information corresponding to the specific contents, the file name of the content is acquired.

The contend processor 5 checks if the content having the acquired file name is present in the specified storage position designated by the specified format (step S35). It is noted that the specified storage position designated by the specified format is the "content directory" which is located immediately beneath the root directory. This information is held in the data processing apparatus 100. When the content is present in the specified storage position (Yes at step S36), the content processor 5 reads the content, and decrypts it as required (step S37). In succession, as required, the data are expanded (decoded), and output to the output section 1 (step S38).

At step S36, on the other hand, when it is judged that the content is not present at the specified storage position, the process goes to "data search process (step S39)". Detail of the data search process is described below by referring to FIG. 7. In data searching process at step S39, when the content is found (Yes at step S40), the link information setting section 7 sets, link information to the found content, on the recording medium 4. After setting of the link information, going to step S37, the same process as when the content is present at the specified storage position is executed.

If failing in data search process at step S39 and no content is found (No at step S40), after error process (step S41) such as issuing of error message, returning to step S33 for displaying the list of contents that can be played back, and the same process is repeated thereafter.

2.3 Data Search Process

Figure 7:
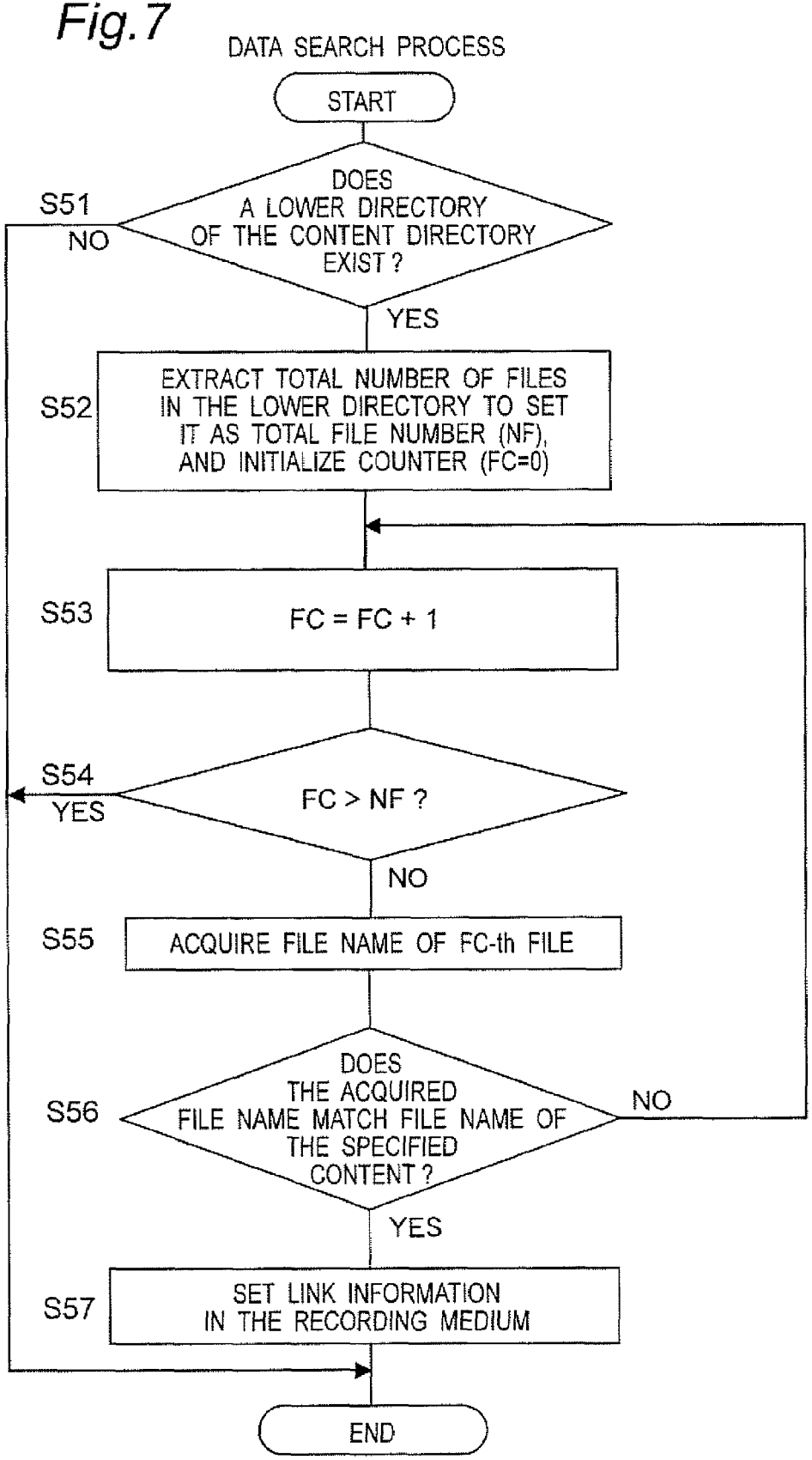
FIG. 7 is a flowchart of data search process of the data processing apparatus in embodiment 1.

Referring next to FIG. 7, detail of data search process (step S39) in the data playback process mentioned above is described. The data search process is executed by the search section 6.

In the recording medium 4, it is checked if a lower directory of the content directory exits by investigating the directory containing the management information (step S51). When it exists (Yes at S51), the total number of files existing in the lower directory is extracted, and set it as a total Wile number NF, and the value of counter FC is set to 0 (step S52).

Then, the counter FC is incremented by one (step S53). Comparing the counter SC and the total file number NF, when the counter FC is greater than the total file number NF (Yes at step S54), the process is terminated since it means that investigation of all files in the directory is over.

If the counter FC is not greater than the total file number NF (No at step S54), a file name of the FC-th file in the lower directory is acquired (step S55). It is judged if the acquired file name matches the file name of the content specified by the user (step S56). When it matches, the link information setting section 7 sets the link information in the recording medium 4 (step S57). When not matches, back to step S53, the next file name in the lower directory is acquired, and the same process is repeated (steps S53 to 56).

For the content data right after recording in the recording medium 4 according to the recording process flow of FIG. 5, data search process shown in FIG. 7 is not required. However, the recording medium 4 is detachable. Thus after the recording process according to the flow of FIG. 5, the recording medium 4 may be removed from the data processing apparatus 100, and then loaded into a slot of other data processing apparatus (for example, personal computer). In such a case, for example, the content of the recording medium 4 can be displayed, using software or displaying the contents of the recording medium 4 in hierarchical structure of file, directory and driver (for example, the software such as Explorer mounted on Windows (registered trademark)). Alternatively using a mouse and a keyboard, the data on the recording medium 4 can be easily copied or moved. In such case, regardless of the user's intent, the data on the recording medium 4 may be moved by erroneous operation, and the process shown in FIG. 7 is effective in such a case.

Figure 8A:
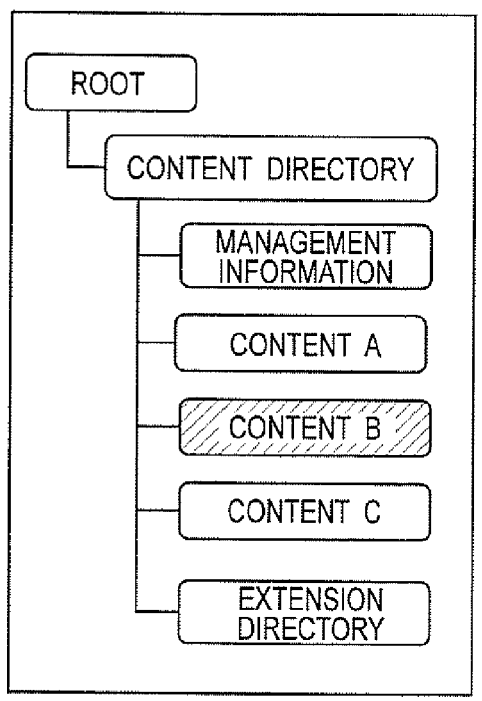
FIGS. 8A and 8B show an example of data moving by user's erroneous operation to the recording medium.

FIG. 8A shows a state in which the content data is stored at a position conforming to the specified format in the recording medium 4, that is, a normal state. The content directory is present immediately beneath the root directory, and includes files such as management information, content A, content B, and content C, and an extension directory for extension.

Figure 8B:
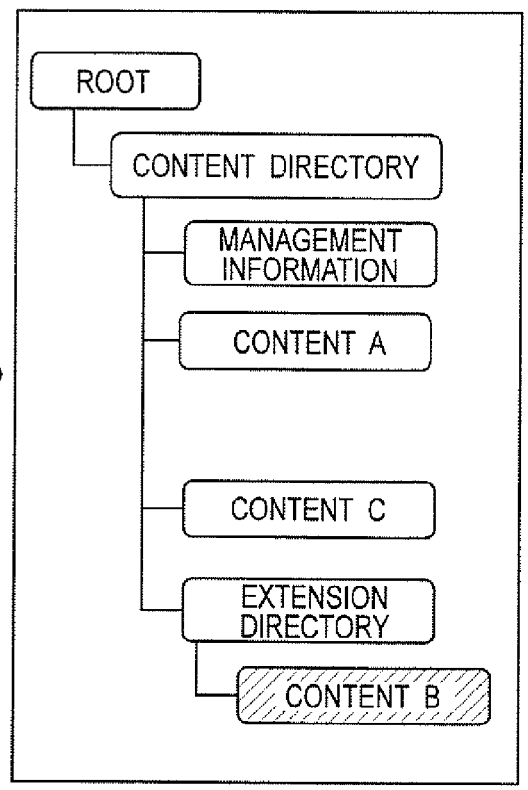

FIG. 8B shows a state which the file of content B has been moved to the extension directory by user's mistake from the state shown in FIG. 8B. In this case, for example, the user may not notice that the data are moved, and may remove the recording medium 4 from the personal computer and load the medium 4 into the data processing apparatus 100. When the recording medium 4 in such a state is loaded into the data processing apparatus 100, the data search process as shown in FIG. 7 is needed.

2.4 Link Information Setting

Figure 9:
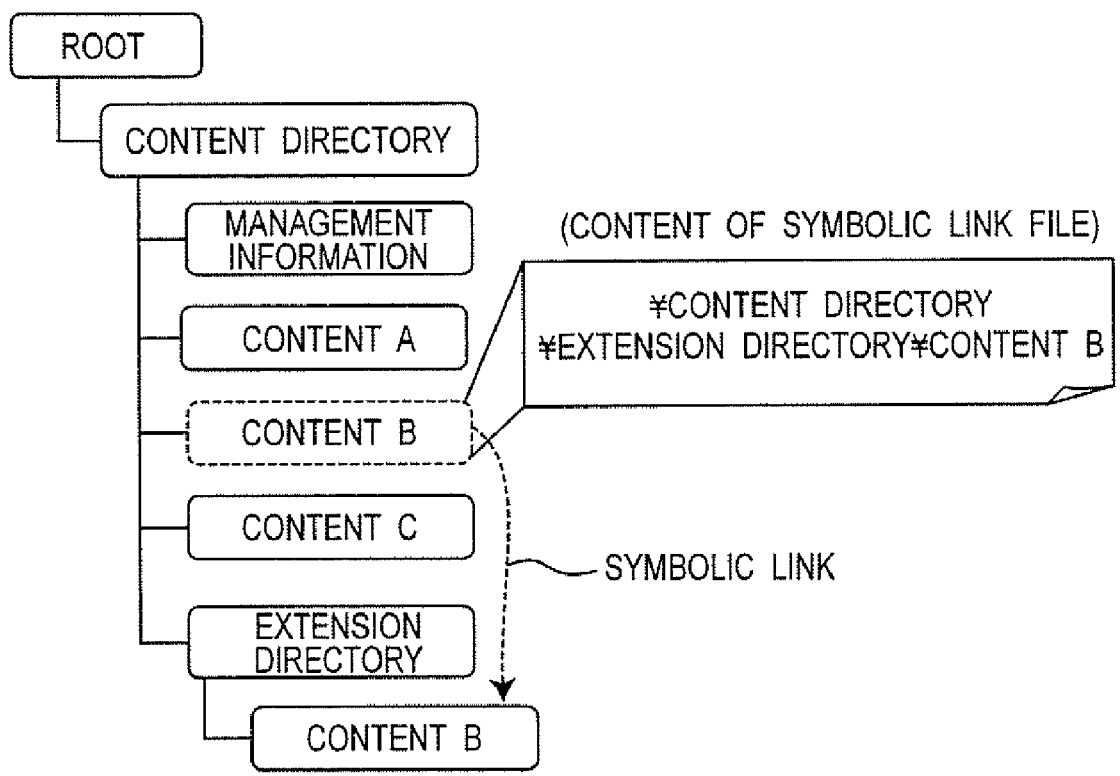
FIG. 9 is an example of setting of link information by symbolic link.

When the data search process finds content B which has been moved to the extension directory, the link information setting section 7 sets the link information, for example, as shown in FIG. 9. FIG. 9 is an example of setting of link information, using a function called "symbolic link" provided by UNIX-like file system ("UNIX" is registered trademark). The symbolic link is a function for enabling access to the entity (main body) of data or program file, with other name (pass name) in addition to the original name (pass name). This function makes it possible to access one file as if the one file is stored in plural different locations on the directory tree. Since the entity of file is not copied in plural locations, the recording capacity of the recording medium managed by the file system can be saved.

Figure 10:
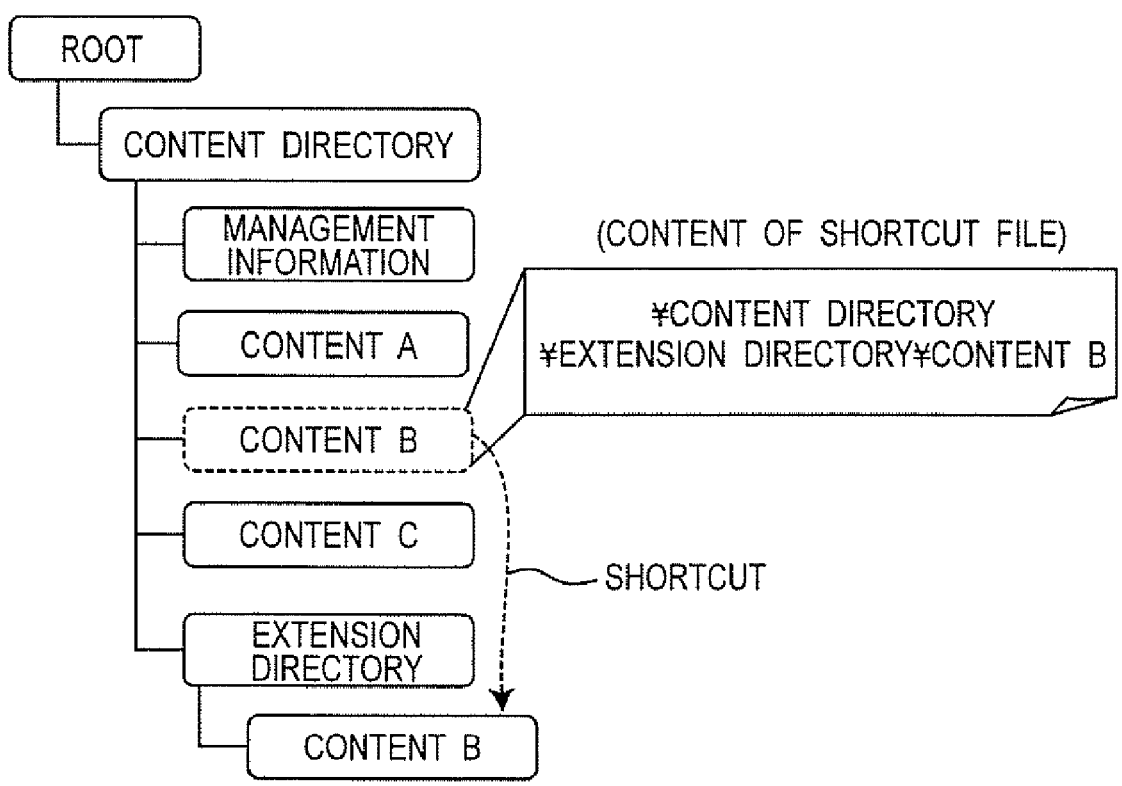
FIG. 10 is an example of setting of link information by shortcut.

In the example in FIG. 9, the link information setting section 7 creates a symbolic link named "content B" beneath the content directory. The entity of the symbolic link is a file to which an attribute showing that it is a symbolic link is added. As a content of the file, the pass name of the link destination which stores the entity data is stored. In the example in FIG. 9, the content of the symbolic link file of "content B" is "\CONTENT DIRECTORY\EXTENSION DIRECTORY\CONTENT B." When an access to the symbolic link arises, the file system changes the pass name of access destination to the pass name defined in the content of the symbolic link file. That is, when an access to "\CONTENT DIRECTORY\CONTENT B" arises, the file system changes the pass name to "\CONTENT DIRECTORY\EXTENSION DIRECTORY\CONTENT B" to access the file entity. Herein, "\" is the divider for dividing layers of directory tree, and the root directory assumes to be expressed by a symbol "\". That is, access to the symbolic link created beneath the content directory makes it possible to access the content B which is moved beneath the extension directory after erroneous operation in FIGS. 8A and 8B. Although this is an example of using the function of symbolic link presented by UNIX-like file system as the link information, the same operation is realized using a function called "shortcut" in Windows (registered trademark) system as shown in FIG. 10.

Thus, according to the embodiment, even if the content data is present at different position from the position designated by the specified format, search is conducted for the content, and the link information is set. Accordingly, such content data can be handled as the data according to the specified format.

Embodiment 2

Embodiment 2 of the invention is specifically described below with reference to the drawings.

This embodiment describes a preferred example of a data processing apparatus which is a play only model. Accordingly, the data processing apparatus of the embodiment does not include elements necessary for recording contents.

Figure 11:
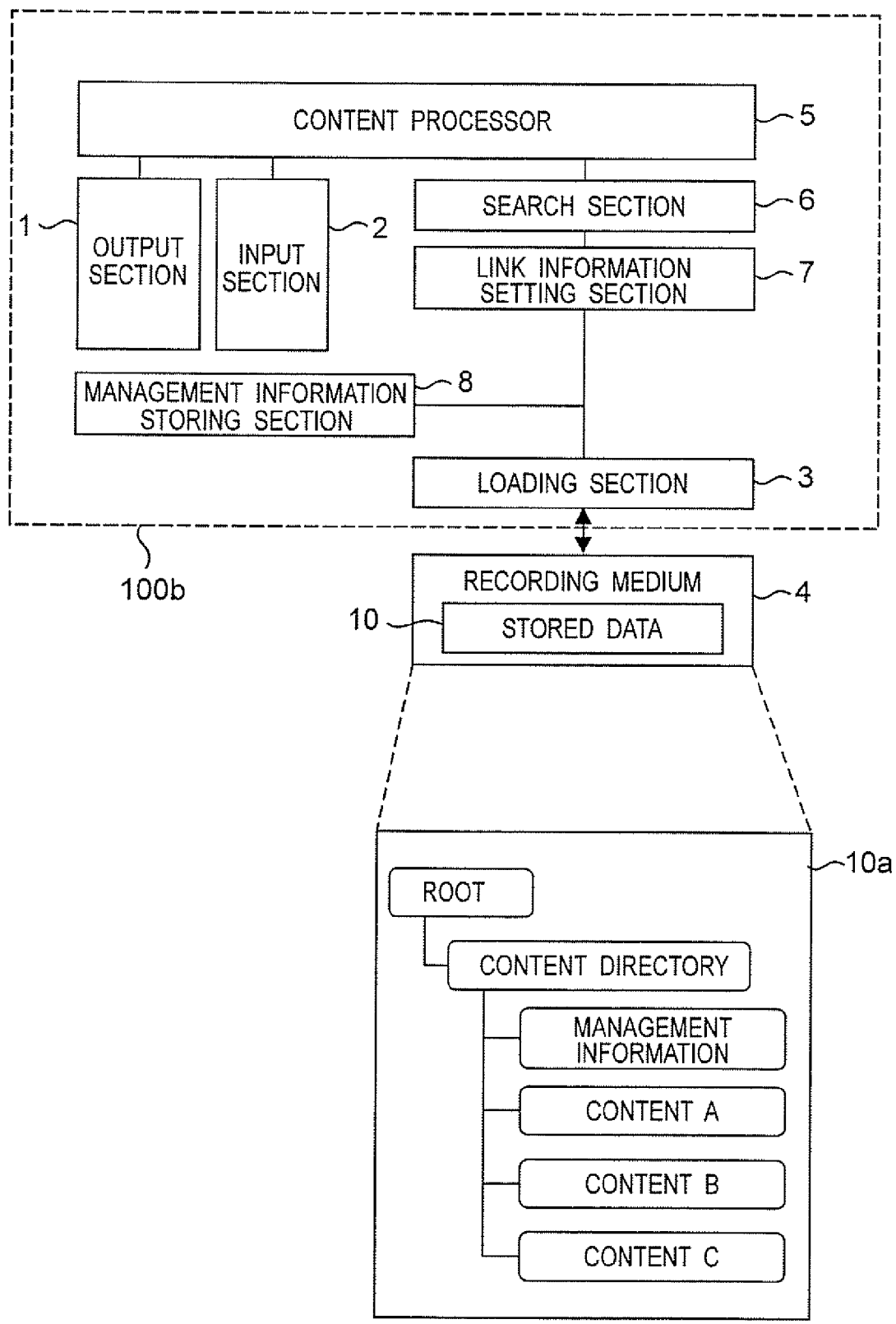
FIG. 11 is a block diagram of a functional configuration of the data processing apparatus in embodiment 2 of the invention.

FIG. 11 is a block diagram of a functional configuration of the data processing apparatus in embodiment 2 of the invention. The data processing apparatus 100b of the embodiment is different from that of embodiment 1 in having a management information storing section 8 for storing management information which is read from the recording medium 4. The management information storing section 8 further stores link information.

Figure 12:
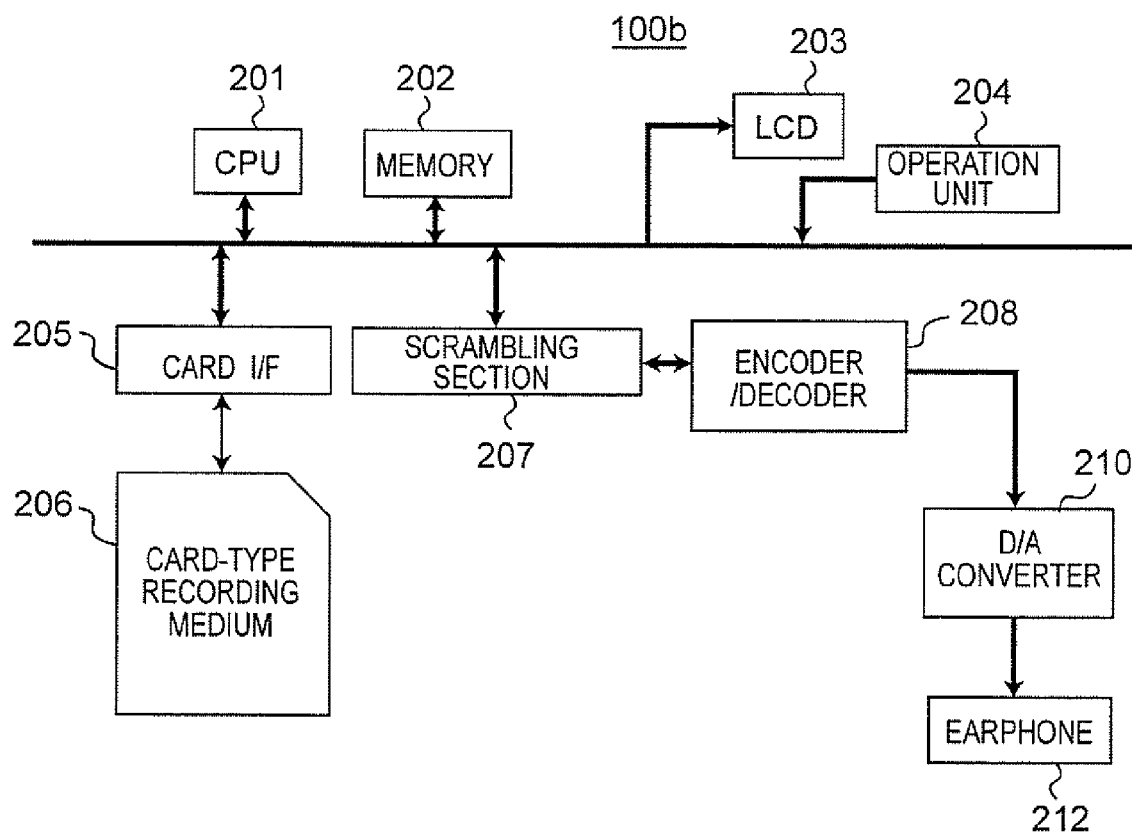
FIG. 12 is a diagram of a hardware configuration of the data processing apparatus in embodiment 2.

FIG. 12 is a diagram of a hardware configuration of the data processing apparatus in embodiment 2. What differs from embodiment 1 is that elements 209, 211, and 213 necessary for content recording operation are not provided because the data processing apparatus of this embodiment is for play only.

The basic flow of process of the data processing apparatus 100b in embodiment 2 is same as that of the data processing apparatus 100 in embodiment 1, and only the different points are described below.

Figure 13:
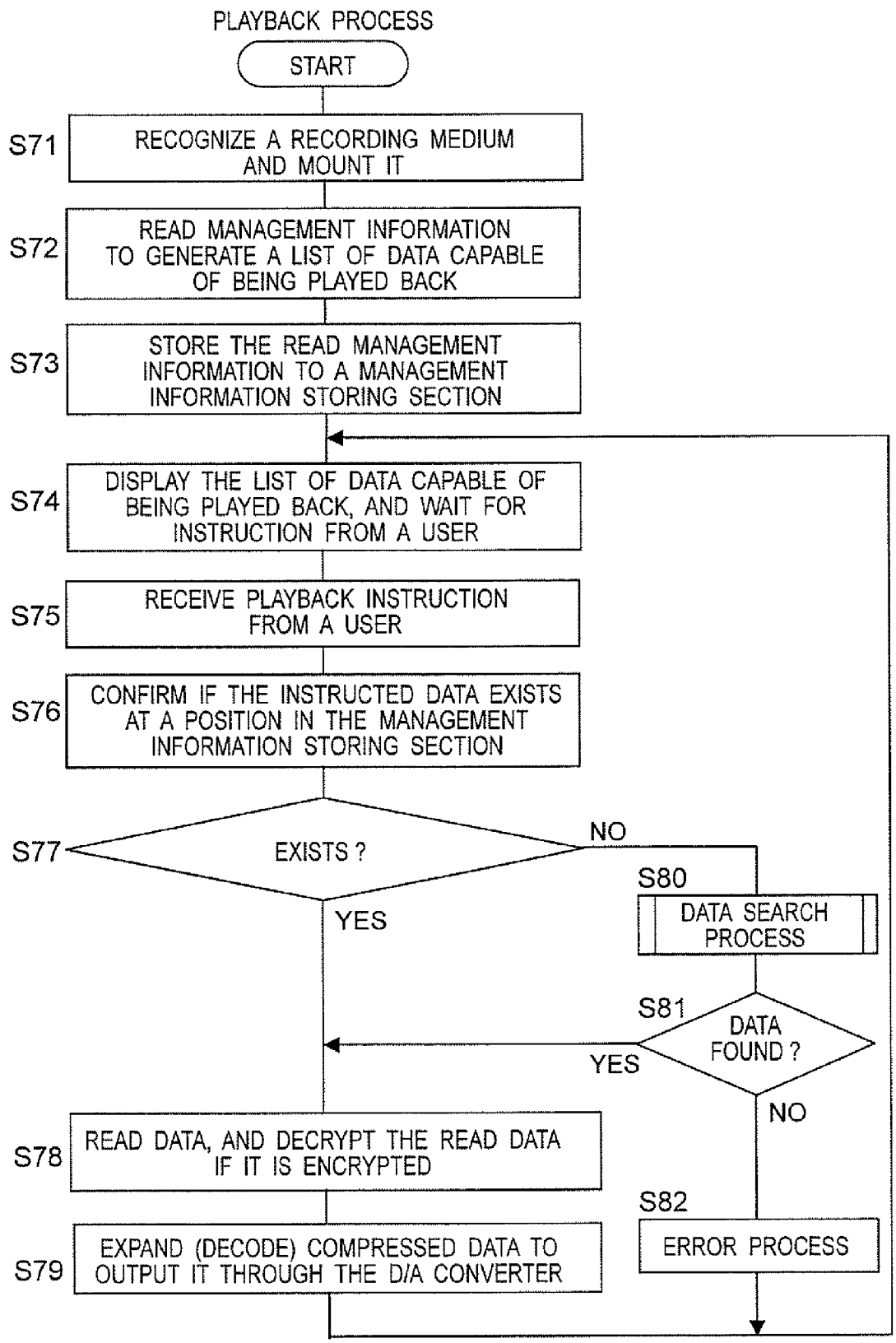
FIG. 13 is a flowchart of content playback process of the data processing apparatus in embodiment 2.

FIG. 13 is a flowchart of playback process of the data processing apparatus 100b in embodiment 2.

The content processor 5 recognizes the recording medium 4 (S71) to read the management information from it (S72), and then stores the read management information into the management information storing section 8 (S73). Then, the list of data which can be played back is displayed (S74). When a playback instruction from the user is received (S75), the content processor 5 with reference to the management information stored in the management information storing section 8 checks if the specified content exists at the position designated by the specified format (step S76). If it exists (Yes at step S77), a process such as decoding or expanding is applied to the content which is then output (S78, S79).

When the specified content does not exist at the position designated by the specified format, the data search process is executed (S80). When the content is found by the data search process (Yes at step S81), the link information setting section 7 stores information equivalent to the link information in the management information stored in the management information storing section 8. The reason of updating of management information in the management information storing section 8 is that the data processing apparatus 100b of the embodiment can not record data in the recording medium 4 because it is for play only.

Figure 14:
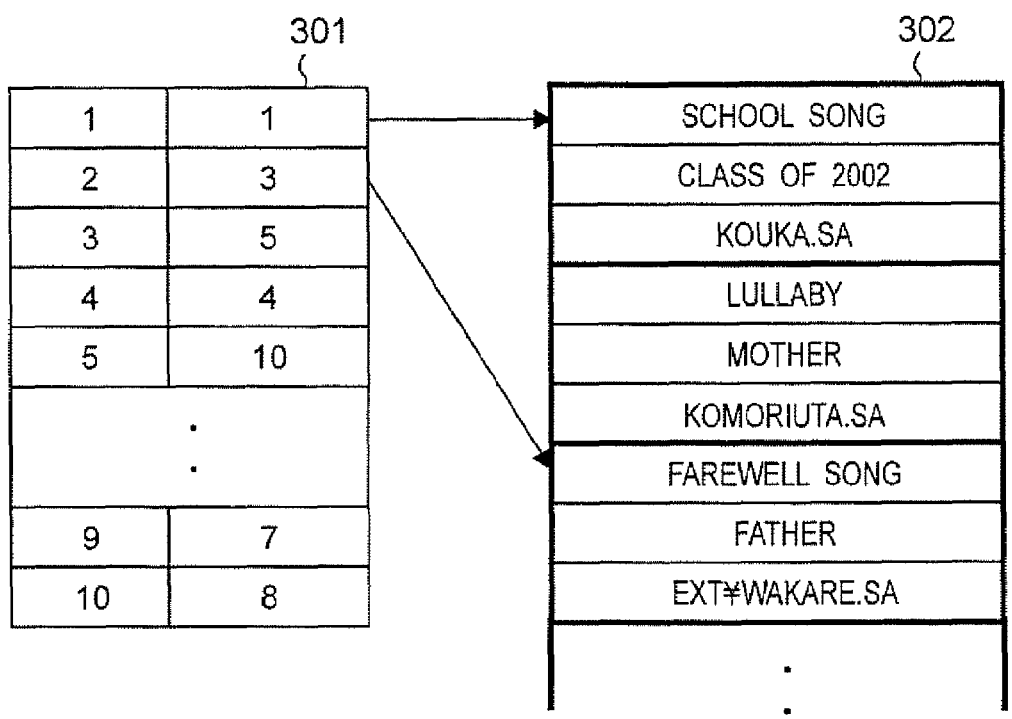
FIG. 14 is data example of management information in embodiment 2.

FIG. 14 is a data example of the management information stored in the management information storing section 8 by the link information setting section 7 as a result of the data search process (S80) In this example, in the track information 302, the file name corresponding to track number 3 is "EXT\WAKARE.SA". This file name indicates the file "WAKARE.SA" existing in the extension directory of which name is "EXT."

Figure 15:
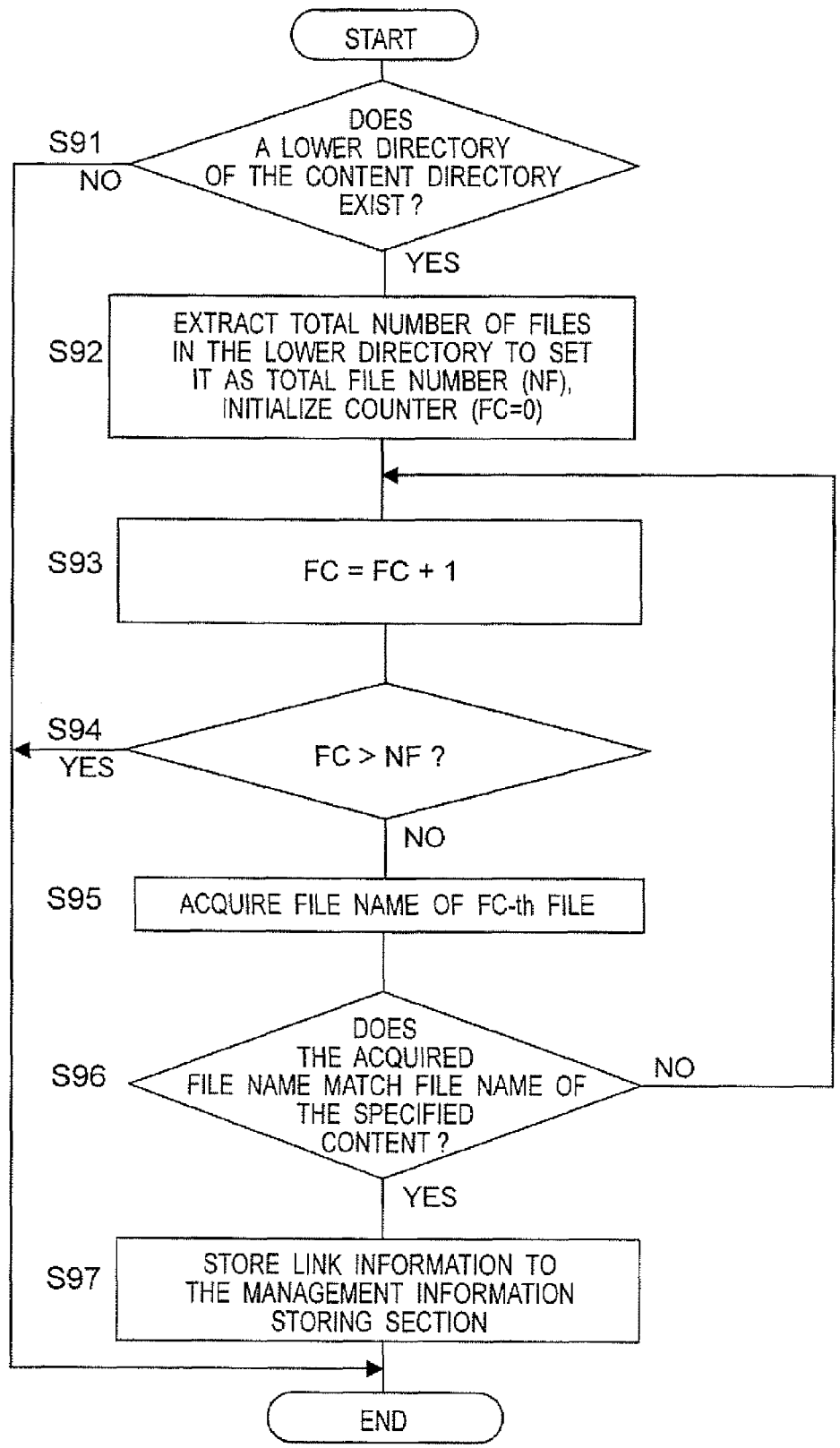
FIG. 15 is a flowchart of data search process in the data processing apparatus in embodiment 2.

FIG. 15 is a flowchart of data search process (S80) in the data playback process.

As a result of searching for a lower directory, when the specified content is found, the link information is stored to the management information storing section 8 (step S97). Other process (S91 to S96) is same as those (S51 to S56) explained in FIG. 7.

The data processing apparatus 100b of the embodiment stores one the management information when is read from the recording medium 4 to the management information storing section 8. Thereafter, update of management information, for example, addition of management information for the content data found by the data search process is conducted to the management information storing section 8. The content processor 5 plays back the content according to the information stored in the management information storing section 8.

According to the embodiment, even if content data exists at a position different from that defined by the specified format, the corresponding content data can be retrieved according to the management information and the link information can be set. Thus, such content data can be handled as the data conforming to the specified format according to the management information in the data processing apparatus.

The embodiment may include the following modified examples.

(1) The data processing apparatus of the embodiment is described as being for play only, but it may also include a recording function.

Figure 16A:
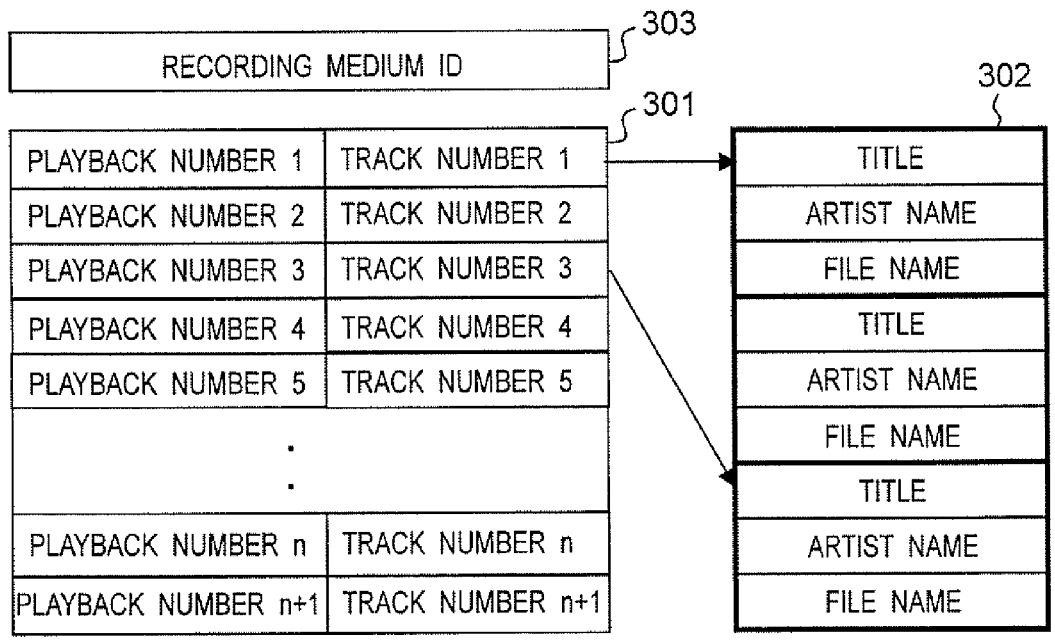
FIG. 16A is a diagram of other data structure of management information in embodiment 2.
Figure 16B:
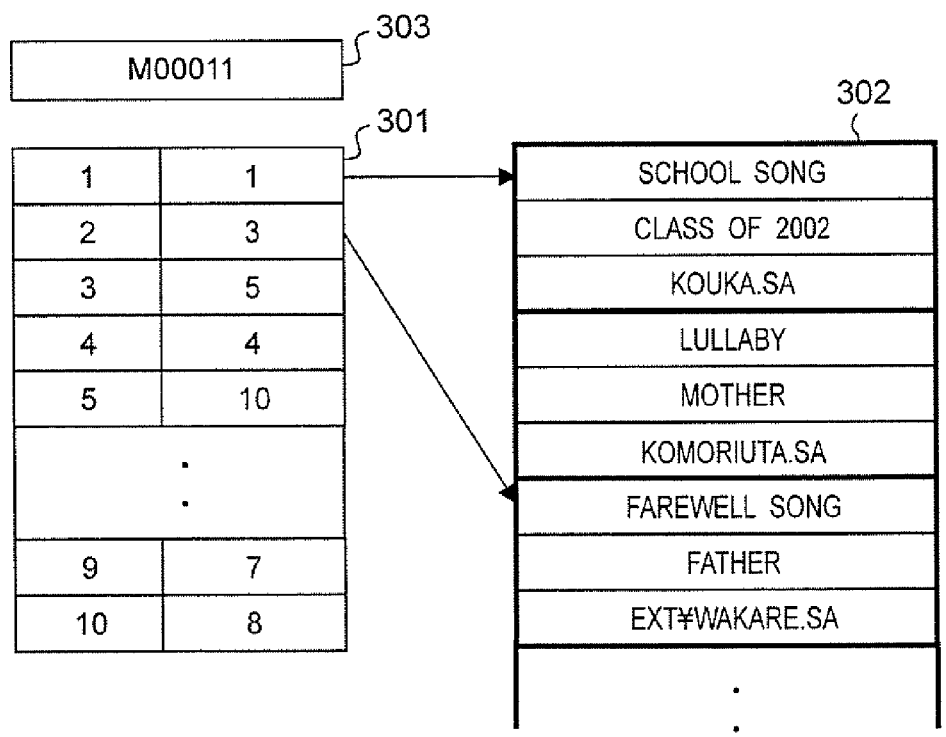
FIG. 16B is other data example of management information in embodiment 2.

(2) When a unique identification number (recording medium ID) is added to the recording medium 4, in the data processing apparatus 100b, using the recording medium ID, the management information may be managed in each recording medium. In this case, when reading the list information 301 and track information 302 from the recording medium 4, the data processing apparatus 100b read also the recording medium ID 303, and stores the read information in the management information storing section 8 as shown in FIG. 16A. FIG. 16B shows a specific example of the structure shown in FIG. 16A.

For example, when recovered from a sudden power down, the data processing apparatus 100b reads the recording medium ID from the recording medium 4 and compares the read recording medium ID with the recording medium ID stored in the management information storing section 8, and thus can recognize if the recording medium 4 changes before and after the power down. If not changed, the recording medium ID stored in the management information storing section 8 is used directly, or if changed, management information is newly read from the recording medium 4 and stored in the management information storing section 8. Hence, the management information conforming to the recording medium can be always utilized.

Embodiment 3

Embodiment 3 of the invention is specifically described below with reference to the drawings.

In the embodiment, the functional structure and hardware configuration of the data processing apparatus are same as in embodiment 1.

In the embodiment, the management information further manages content ID which is identification information assigned uniquely to each content.

Figure 17:
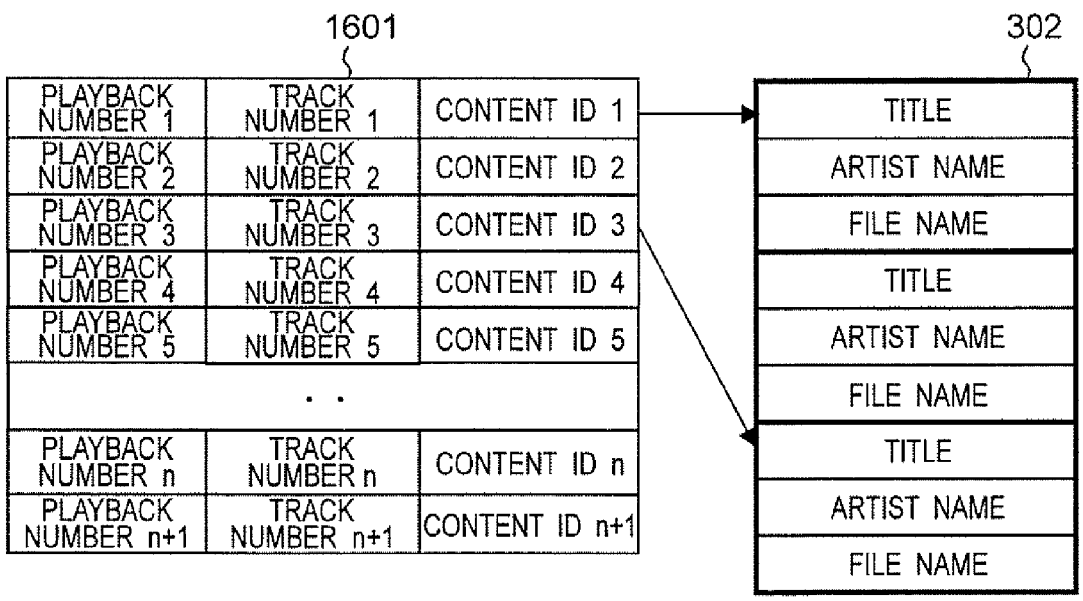
FIG. 17 is a diagram of data structure or management information in embodiment 3.
Figure 18:
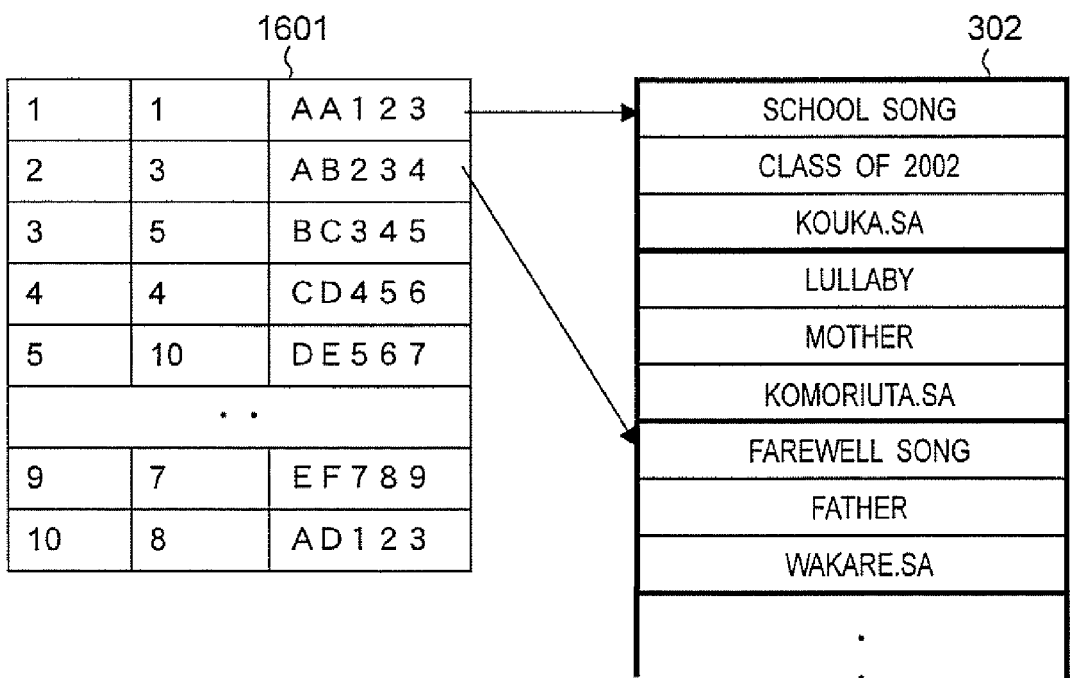
FIG. 18 is data example of management information in embodiment 3.

FIG. 17 is a diagram of data structure of the management information stored in the recording medium 4 in the embodiment. FIG. 18 is a data example of the management information stored according to the data structure. Play list information 1601 shown in FIG. 17 and FIG. 18 is same in structure and function as the play list information 301 shown in FIG. 3 and FIG. 4, except that the content ID is included. Track information 1602 shown in FIG. 17 and FIG. 18 is same in composition and function as the track information 302 shown in FIG. 3 and FIG. 4.

Figure 19A:
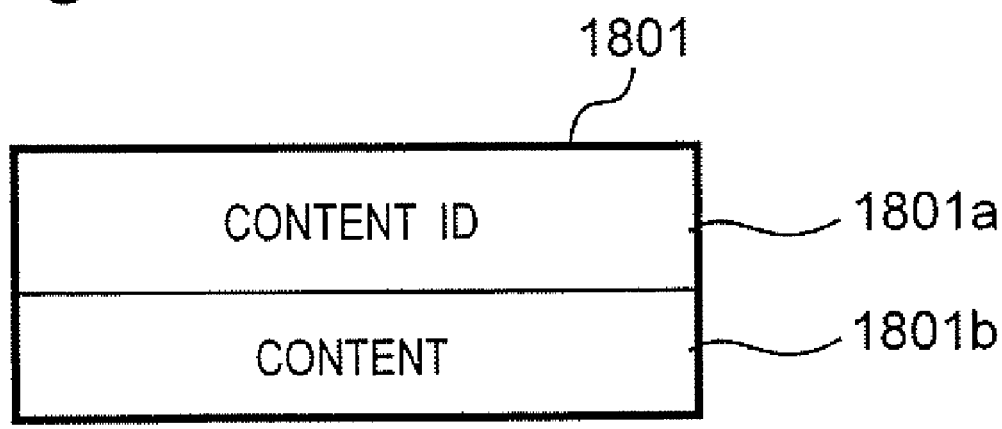
FIG. 19A shows structure of content file.
Figure 19B:
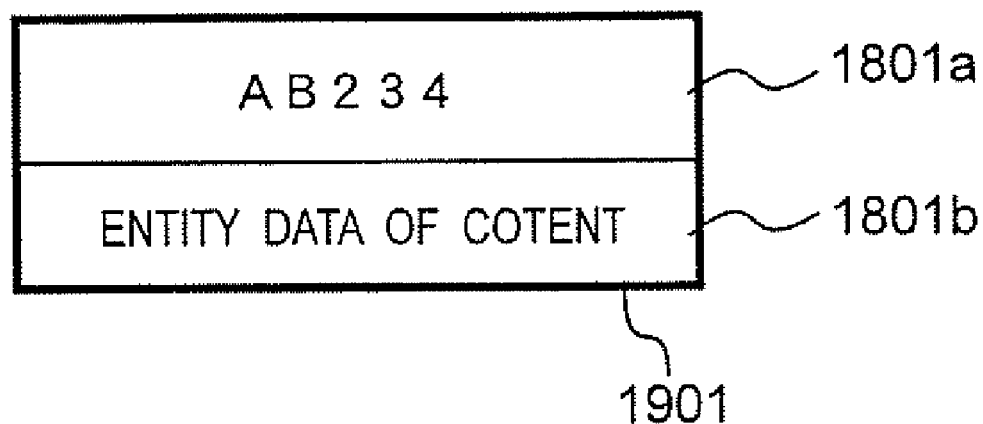
FIG. 19B shows data example of the content file.

FIG. 19A shows an example of data structure of the content file, and FIG. 19B shows an example of data stored according to the data structure of the content file. As shown in these diagrams, the content file 1801 includes content ID 1801*a* which is assigned uniquely to the content, and entity data portion 1801*b* of the content. FIG. 19B shows the structure of the content file named "WAKARE.SA". As the content ID 1801*a* corresponding to entity data portion 1801*b* of the content file, "AB234" is stored.

Referring now to FIG. 20, a process for recording a content to the recording medium by the data processing apparatus in embodiment 3 of the invention is explained.

In the flowchart in FIG. 20, what differs from the flowchart in FIG. 5 of embodiment 1 is that a step of acquiring unique content ID corresponding to the content to be recorded (step S115) is added. The content ID acquired in this step is stored simultaneously in the content when recording the compressed data in the recording destination according to the specified format in step S117. When the play list information 1601 of the management information is updated in step S118, the content ID is also used. These processes allow information of content ID uniquely assigned to the content stored in the recording medium by the data processing apparatus to be held in both content and management information.

The playback process in this embodiment is same as that shown in FIG. 6 in embodiment 1, and the explanation is omitted.

Figure 21:
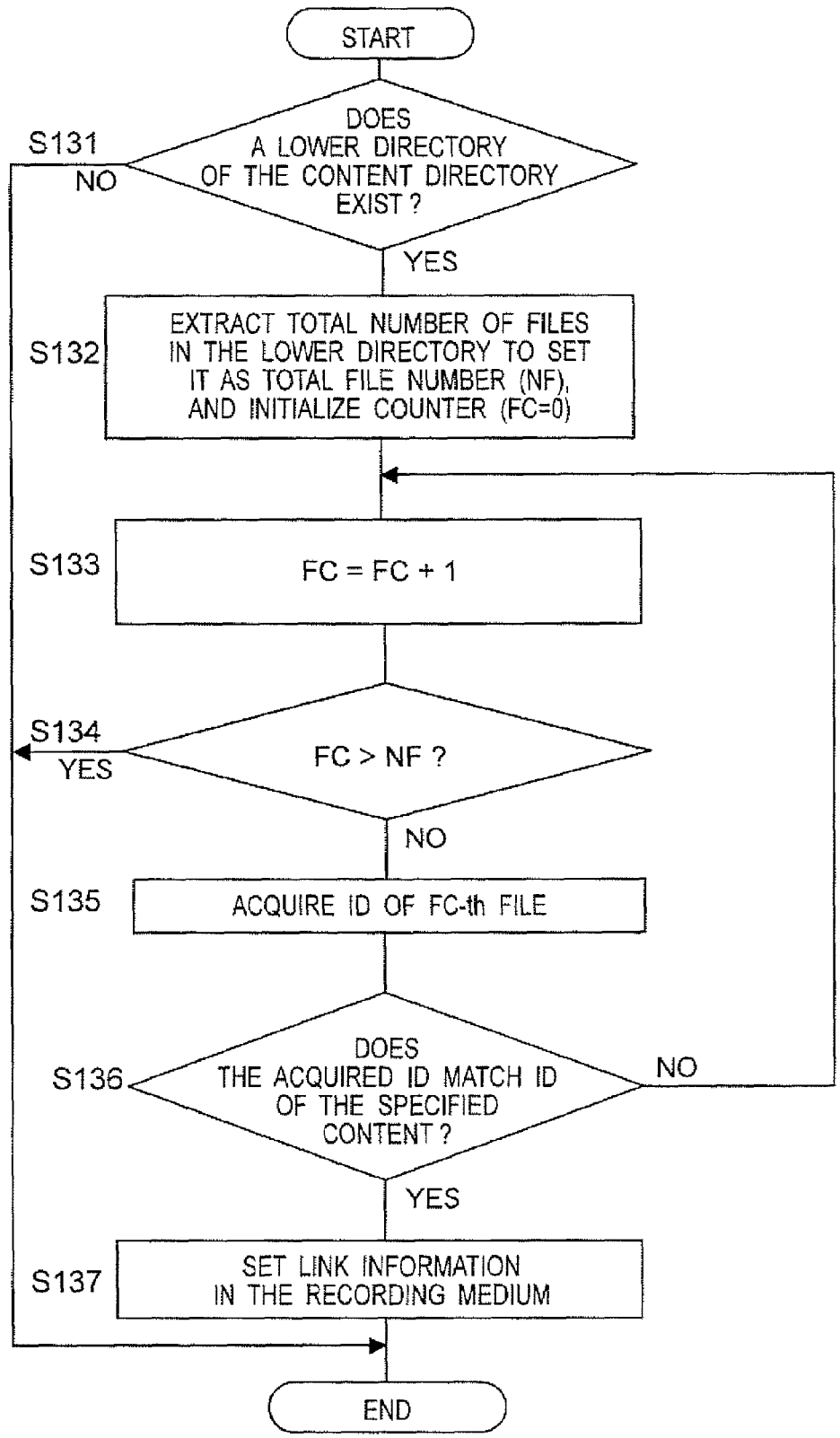
FIG. 21 is a flowchart of data search process in the data processing apparatus in embodiment 3.

Referring now to FIG. 21, the data search process in this embodiment is explained. In the flowchart in FIG. 21, what differs from the flowchart in FIG. 7 in embodiment 1 is that the content ID is used instead of file name, in order to find a targeted content file (that is, file to be retrieved).

Same as in the procedure shown in FIG. 7, while content files existing in the lower directory of the content directory are reviewed sequentially (S132 to S134), each content file is opened, and content ID contained in each file is acquired (S135). The acquired content ID is compared with the content ID of the targeted content (S136). When a file having the same ID as the content ID of the targeted content stored in the management information is found, in the same procedure as in embodiment 1, the link information setting section 7 sets the link information, using the symbolic link or shortcut function (S137). As a result, same as in embodiment 1, the link is extended to the file stored in other place than specified storing position, and the content can be utilized.

According to the embodiment, when the contents are managed with the ID included in the content file, even if the content file exists in other place than that defined by the specified format, the link information is set by searching for the corresponding content data on the basis of the management information, and hence such content file can be handled as data based on specified format.

The embodiment uses the ID in search process, and thus it can be applied even if the file name of the contents file is changed by user's erroneous operation.

The concept of the invention can also be applied to key separation type content distribution service. The key separation type content distribution service means a service for distributing content data and key data which is used for encrypting the content data to the user through the respective routes. In this case, the management file including the key data is stored in a detachable recording medium, and the content data is stored in a recording medium accessible by the data processing apparatus, such as a hard disk drive (HDD).

In this case, the key data and content data are stored in different recording media, and thus means for linking the key data to the content data is needed since storing position of contents usually depends on the data processing apparatus. According to the embodiment, the linking is achieved by the content ID. Since the ID is stored in both management information including key data and the content data, the corresponding file can be retrieved easily.

In the embodiment, functions such as symbolic link and shortcut are used, but as explained in embodiment 2, the data processing apparatus may hold a memory region for the management information storing unit, and the search result file may be recorded in the management information storing unit. Hence the process can be achieved without writing data into the recording medium 4.

In the data search process, first, only in the content data matched in file name, the contained content ID can be confirmed. Hence, in the case of a greater number of contents stored in the recording medium, the search time can be shortened.

The invention is described herein according to three embodiments, but the scope of the invention is not limited to the foregoing embodiments. The invention may be changed and modified within the scope not departing from the true spirit of the invention. Therefore the scope of the invention also includes the following variations.

(1) In the embodiments, as long as the playback function is provided, the recording function is not always required.

(2) In the embodiments, the management information is implemented so that play list information and track information are provided individually. However the configuration is not particularly specified as far as information specifying the content position is included.

(3) In the embodiments, the data search range when the content is not found is the lower directory of the specified directory (content directory). However a wider range may be searched. For example, the data search range may be a directory of the same or upper level of the specified directory. Alternately whole range of the recording medium may be searched. Any arbitrary region may be searched in any range accessible from the data processing apparatus, such as other recording medium connected to the data processing apparatus (other memory card or hard disk), a server connected via a network, peripheral devices, and so on. According to the configuration, it is enough for the user to store only the management information relating to contents desired to be played back in the recording medium. That is, it is not always necessary to store contents in the recording medium, so that contents of larger size than the capacity of the recording medium can be played back.

(4) In the embodiments, the scrambling section for encrypting process is provided. If the copyright protection is not needed, the scrambling section is not always needed.

(5) In the embodiments, it is assumed to compress the digital data, but the compression is not always necessary.

(6) In the embodiments, the user instructs playing back or recording, but the data processing apparatus may execute predetermined process automatically.

(7) In the embodiments, when playback process is instructed, the presence of the content is confirmed, and if not present, search is conducted for the content. But these processes may be executed at arbitrary timing, such as at the time of loading of the recording medium, feeding of power, or playing back or recording contents.

Figure 22:
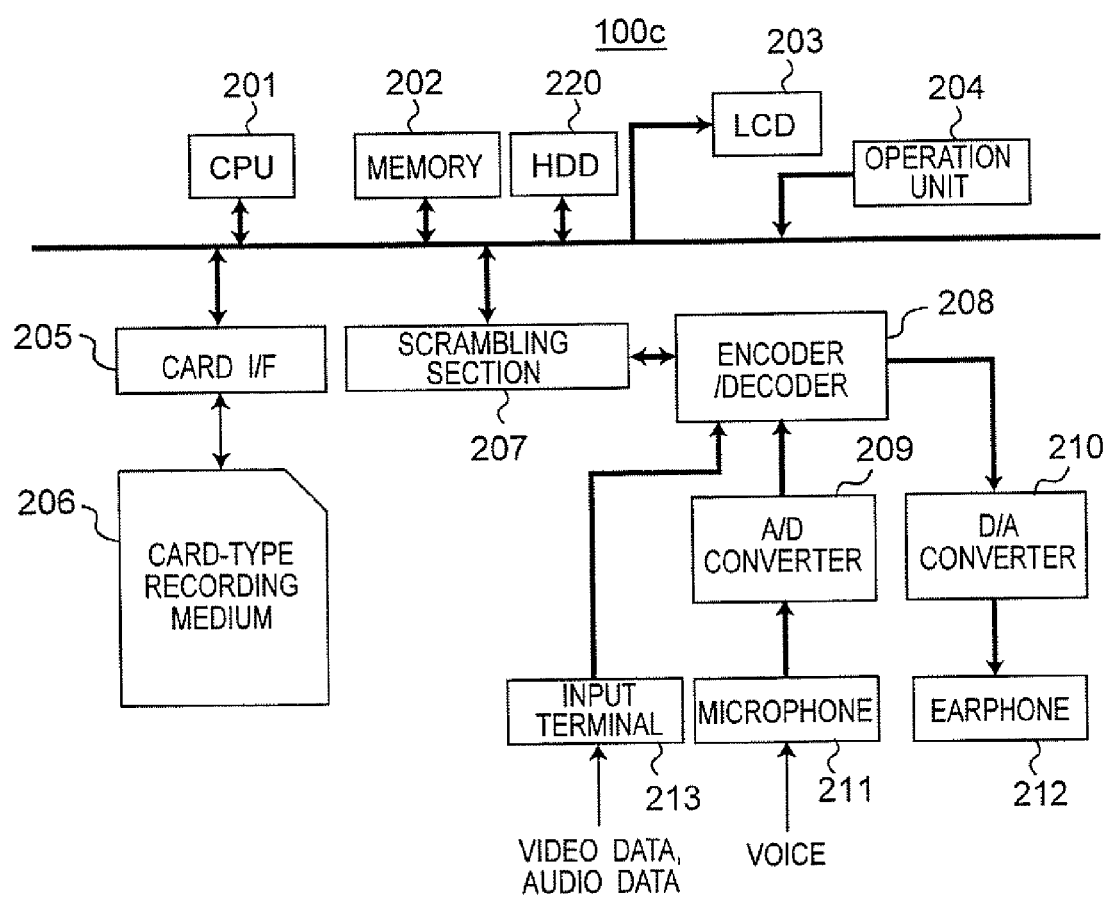
FIG. 22 shows other example of a hardware configuration of the data processing apparatus.

(8) In the embodiments, the recording medium 4 is a detachable recording medium in the loading section 3. However, instead of the detachable recording medium, a hard disk or other recording medium ("data storage unit") incorporated in the data processing apparatus may be used. Besides, as shown in FIG. 22, the data processing apparatus may have both a data storage unit (had disk 220) and a detachable recording medium (card-type medium 206). In this case, if the content data to be played back is not present in the specified storage position, both the detachable recording medium and the data storing unit may be specified for search range. Further, the content data may be stored by priority in the detachable recording medium. When free area of the recording medium becomes less than a predetermined threshold, the content data may be stored in the data storage unit, and the management information for managing the content data stored in both may be stored in the detachable recording medium.

(9) In the embodiments, part or whole of functions of the data processing apparatus may be realized by software that can be executed by a computer. This software may be a program to be executed by a computer, and the program may be stored and provided via a computer readable information recording medium.

The invention may be modified and changed in various formed by those skilled in the art, and hence the invention is not limited by the illustrated embodiments alone, but should be limited only by the scope of the attached claims.

This application is related to the Japanese Patent Application No. 2003-426809 (filed Dec. 24, 2003), content of which is incorporated by reference.

INDUSTRIAL APPLICABILITY

According to the invention, even if data recorded in a rewritable recording medium conforming to a specified standard is moved by mistake or erroneous operation by a user and thus the data storage state becomes not up to the standard, the contents can be played back. Hence the invention can be applied to a data processing apparatus using a recordable optical disk or a semiconductor memory card.

The invention claimed is:

1. A data processing apparatus for reading, from a recording medium, content stored in a specified recording area of the recording medium and for playing back read content, the recording medium storing, according to a specified format, content and management information for the content, the data processing apparatus comprising:
a content processor that reads the management information from the recording medium, and that reads the content according to the management information from the recording medium to process the read content;
a searcher that, when the content processor reads the content, searches for the content out of a specified search range, the specified search range being defined according to the specified format as a range for storing content to be reproduced, when the content is managed by the management information and not present in the specified recording area;
a link information setter; and
a management information storage that stores the management information read from the recording medium using an identification number specific to the recording medium to enable management of the management information,
wherein, when the content is found by the searcher, the link information setter updates link information for relating a recording area at which the content was found to the specified recording area so that the content is accessible using the management information,
wherein the management information includes play list information that specifies a playback sequence for playback of the content and track information, the track information including meta information relating to the content,
wherein the specified search range includes a recording area in the recording medium,
wherein the management information manages a content identifier (ID) that is identification information uniquely assigned to each of a plurality of contents, and
wherein the search searches for content to be played back using the content ID.

2. The data processing apparatus of claim 1, wherein the specified search range includes a recording area in the recording medium, the recording medium being incorporated in the data processing apparatus.

3. The data processing apparatus of claim 1, wherein the specified search range includes a recording area of a device connected to the data processing apparatus, the device being connected to the data processing apparatus either directly or via a network.

4. The data processing apparatus of claim 1, wherein the recording medium is a detachable recording medium.

5. The data processing apparatus of claim 4, further comprising: a data storage that stores content conforming to a specified standard format,
wherein the content processor reads the content from the recording medium or the data storage according to the management information to process the read content, and
wherein, when the content processor reads the content, the searcher searches the recording medium or the data storage for the content, when the content to be read is managed by the management information and not present in the specified recording area.

6. The data processing apparatus of claim 5, wherein the content is stored according to a priority in the recording medium, and when a free area of the recording medium falls below a predetermined value, the content is stored in the data storage and the management information, for managing the content stored in the recording medium and the data storage, is stored in the recording medium.

7. The data processing apparatus of claim 4,
wherein the content processor reads the content based on management information stored in the management information storage, and
wherein the link information setter stores the link information on the management information storage.

8. The data processing apparatus of claim 1, wherein when the identification number specific to the recording medium stored in the management information storage differs from an identification number specific to a recording medium to be loaded into the data processing apparatus, the searcher and the link information setter set the link information.

9. The data processing apparatus of claim 8, wherein the recording medium includes copyright protection functionality.

10. A data processing method for reading, from a recording medium, content stored in a specified recording area of the recording medium and for playing back read content, the recording medium storing, according to a specified format, content and management information for the content, the data processing method comprising:
reading management information from the recording medium, and determining the content to be played back according to the read management information;

judging whether if the determined content exists in a specified recording area in the recording medium;

searching a specified search range defined according to the specified format as a range for storing content to be reproduced, for the content, when the determined content is not present in the specified recording area;

updating link information relating a recording area at which the content was found to the specified recording area so that the content is accessible using the management information, when the determined content is found; and storing the management information which is read from the recording medium, using an identification number specific to the recording medium, to enable management of the management information, wherein the management information includes play list information that specifies a playback sequence for playback of the content and track information, the track information including meta information relating to the content, wherein the specified search range includes a recording area in the recording medium, wherein the management information manages a content identifier (ID) that is identification information uniquely assigned to each content, and the searching searches for the determined content using the content ID.

11. The data processing method of claim 10, wherein the specified search range includes a recording area in the a recording medium, the recording medium being incorporated in the data processing apparatus.

12. The data processing method of claim 10, wherein the specified search range includes the recording area of a device connected to the data processing apparatus, the device being connected to the data processing apparatus either directly or via a network.

13. The data processing apparatus of claim 10, wherein the recording medium is a detachable recording medium.

14. The data processing method of claim 13, further comprising:

when the content is stored according to the specified format in the recording medium and a data storage in the data processing apparatus, searching the recording medium or the data storage for the determined content, when the determined content is managed by the management information and not present in the specified recording area.

15. The data processing method of claim 14, further comprising:

storing the content according to a priority in the recording medium;

storing the content in the data storage when a free area of the recording medium falls below a predetermined value; and storing management information, for managing the content stored in the recording medium and the data storage, in the recording medium.

16. The data processing method of claim 13, further comprising:

storing the management information read from the recording medium in the data processing apparatus, wherein determining the content determines the content to be played back based on the management information stored in the data processing apparatus, and determining the link information for the data processing apparatus.

17. The data processing method of claim 13, wherein the recording medium is identified by unique identification information.

18. The data processing method of claim 17, wherein the recording medium includes copyright protection functionality.

19. A computer-readable medium on which a data processing program is recorded, the data processing program causing a computer to execute reading, from a recording medium, content stored in a specified recording area of the recording medium and playing back read content, the recording medium storing, according to a specified format, content and management information for the content, the computer-readable medium comprising:

a management reading code segment, recorded on the computer-readable medium, that reads management information from the recording medium, a determining code segment, recorded on the computer-readable medium, that determines to be played back according to read management information;

a judging code segment, recorded on the computer-readable medium, that judges whether the determined content exists in the specified recording area of the recording medium;

a search code segment, recorded on the computer-readable medium, that searches for specified search range defined according to the specified format as a range for storing content to be reproduced, for the content, when the determined content does not exist in the specified recording area;

a link setting code segment, recorded on the computer-readable medium, that updates link information relating a recording area at which content was found to the specified recording area so that the content is accessible using the management information, when the determined content is found; and a storing code segment, recorded on the computer-readable medium, that stores the management information read from the recording medium, using an identification number specific to the recording medium, to enable management of the management information, wherein the management information includes play list information that specifies a playback sequence for playback of the content and track information, the track information including meta information relating to the content, wherein the specified search range includes a recording area in the recording medium, wherein the management information manages a content identifier (ID) that is identification information uniquely assigned to each of a plurality of contents, and wherein the search coded segment searches for content to be played back using the content ID.

* * * * *